US007404766B2

(12) United States Patent
Adachi et al.

(10) Patent No.: US 7,404,766 B2
(45) Date of Patent: Jul. 29, 2008

(54) GAMING MACHINE

(75) Inventors: Takanobu Adachi, Tokyo (JP); Tahei Nakagawa, Tokyo (JP)

(73) Assignee: ARUZE Corp., Tokyo (JP)

( * ) Notice: Subject to any disclaimer, the term of this patent is extended or adjusted under 35 U.S.C. 154(b) by 618 days.

(21) Appl. No.: 10/697,259

(22) Filed: Oct. 31, 2003

(65) Prior Publication Data

US 2004/0166926 A1 Aug. 26, 2004

(30) Foreign Application Priority Data

Nov. 19, 2002 (JP) ............................. 2002-335667

(51) Int. Cl.
*A63F 13/00* (2006.01)

(52) U.S. Cl. ............................. 463/31; 463/30; 463/32; 463/33; 463/34

(58) Field of Classification Search .............. 463/30–34
See application file for complete search history.

(56) References Cited

U.S. PATENT DOCUMENTS 6,517,433 B2 * 2/2003 Loose et al. .................. 463/20
7,121,945 B2 * 10/2006 Suganuma et al. ............ 463/34
2002/0077172 A1 6/2002 Uchiyama et al.
2003/0087690 A1 5/2003 Loose et al.
2005/0192090 A1 * 9/2005 Muir et al. .................... 463/30

FOREIGN PATENT DOCUMENTS

EP 1 260 928 A2 11/2002
EP 1 260 928 A3 2/2003
JP 2001-353255 A1 12/2001
WO WO-03/039699 A1 5/2003

OTHER PUBLICATIONS

European Search Report Dated Aug. 3, 2004.

* cited by examiner

*Primary Examiner*—Mark Sager
*Assistant Examiner*—Robert Mosser
(74) *Attorney, Agent, or Firm*—Rader, Fishman & Grauer, PLLC

(57) ABSTRACT

The gaming machine has the game result display means for displaying a result concerning with a game and beneficial state generating means for generating a beneficial state for a player when a specific game result is displayed on the game result display means, wherein the game result display means includes first display means and second display means arranged at a more front side than a display area of the first display means when seen from a front side of the gaming machine, and the second display means has a symbol display area capable of transmittably displaying a display result of the first display means therethrough, and wherein display control means controls the second display means so as to move and display the game information 21*a* from the area (21L, 21C, 21R) including symbol display area to the area 23 not including the symbol display area.

27 Claims, 9 Drawing Sheets

FIG.7A WHEN LIQUID CRYSTAL EXISTING AT SYMBOL DISPLAY AREAS IS NOT DRIVEN
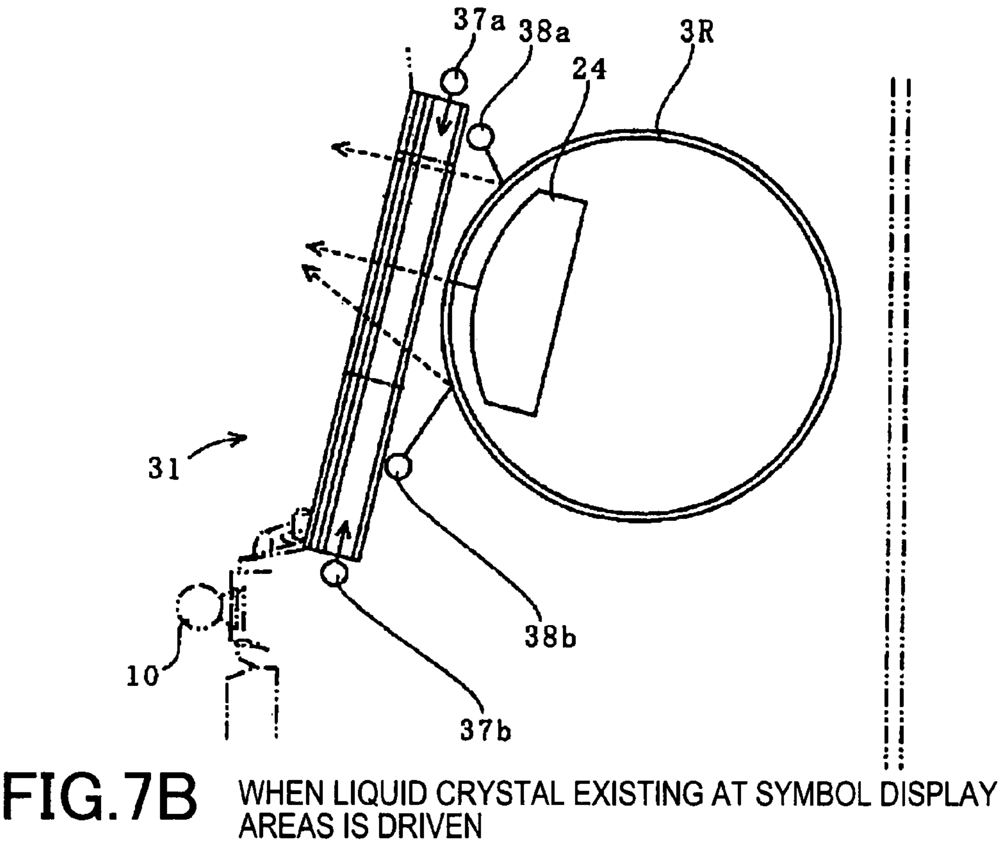
FIG.7B WHEN LIQUID CRYSTAL EXISTING AT SYMBOL DISPLAY AREAS IS DRIVEN
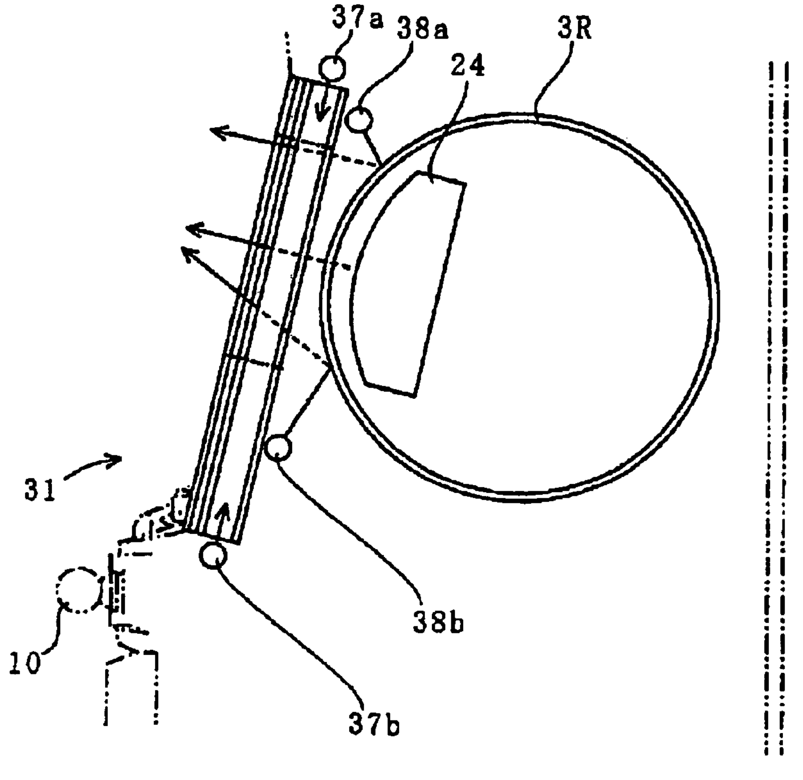

GAMING MACHINE

FIELD OF TECHNOLOGY

The present invention relates to a gaming machine having game result display means for displaying a result concerning with a game thereon and beneficial state producing means for producing a beneficial state for a player when a predetermined game result is displayed on the game result display means, the gaming machine including so-called Japanese pachi-slot machine; slot machine; ball flipping machine such as the first grade~third grade Japanese pachinko machine, arrange ball machine, mah-jong ball gaming machine or slit-slot machine; video slot machine; video poker machine and the like.

DESCRIPTION OF RELATED ART

For example, the Japanese pachi-slot machine has a mechanically variable display device in which it is provided a plurality of rotating reels each of which variably displays plural symbols within a display window arranged in front of the machine, the reels being parallel provided in plural lines. According to start operation by a player, the control means drives and controls the variable display device and the reels are rotated, thereby symbols on the reels are variably displayed. And rotation of each reel is stopped automatically or based on stop operation by the player. At that time, in a case that the symbols of each reel appearing within the display window comprises a predetermined combination (the winning mode), game media such as medals or coins are paid out, thereby a predetermined benefit is given to the player.

And as the above mentioned Japanese pachi-slot machine, it is, for example, proposed a gaming machine (Japanese pachi-slot machine) having function described in Japanese Unexamined Publication No. 2001-353255. This gaming machine has a plurality of reel drums, reel strips each of which is arranged on an outer periphery of each reel drum and on each outer surface of which the symbols are described in a divided manner, light sources each of which illuminates the symbol division on each reel strip from the backside thereof and is arranged within each reel drum and control means for controlling illumination by the light sources. Here, in the reel strip, the symbol portion is made semitransparent and the background of the symbol is made transparent or semitransparent, and the light source is constructed from a plurality of luminous diodes arranged in a dot-matrix manner. The control means controls light emission of each luminous diode, thereby light emission of the light source is controlled so as to display characters or figures by the emitted diodes, thereby game information to be notified is displayed by the luminous diodes.

See, for example, Japanese unexamined Publication No. 2001-353255.

SUMMARY OF THE INVENTION

However, this notification (including erroneous notification) is realized by providing game information to the player, the game information being formed by combining symbols described on each of plural reel drums (in the gaming machine described in Japanese Unexamined Publication No. 2001-353255, two or three reel drums exist) at a stage that the reel drums are stopped, with the above mentioned light source. Thus, the game information is very complex and is therefore hard to understand.

The object of the present invention is to provide a gaming machine in which the game information is moved from an area including a display area to which the player's eyes are easily concentrated, thereby the game information attracts attention of the player and it can be conducted notification easy to understand for the player by changing display mode which is understandable for the player because the game information is only moved.

The gaming machine according to the present invention comprises: game result display means (for example the reels 3L, 3C, 3R mentioned later) for displaying a result concerning with a game; beneficial state generating means (for example, the main control circuit 41 mentioned later) for generating a beneficial state for a player when a specific game result is displayed on the game result display means; wherein the game result display means includes first display means (for example, the reels 3L, 3C, 3R mentioned later) and second display means (for example, the liquid crystal display device 31) arranged at a more front side than a display area of the first display means when seen from a front side of the gaming machine and the second display means has a symbol display area capable of transmittably displaying a display result of the first display means therethrough, and wherein display control means (for example, the main control circuit 41, the sub-CPU 73 mentioned later) is provided, the display control means controlling the second display means so as to move and display game information (for example, "ドーン" 21*a* mentioned later) from a first area including the symbol display area to a second area not including the symbol display area.

In the gaming machine of the present invention, the first display means may have one or more symbol display parts capable of variable display, and the display control means may control the second display means so as to move and display the game information from the first area to the second area substantially at the same time as the variable display in the symbol display parts is stopped and displayed (for example, the symbols displayed when the reels 3L, 3C, 3R are stopped).

In the gaming machine of the present invention, light transmittance rate of the symbol display part may be changed.

In the gaming machine of the present invention, a window frame display area may be formed at a periphery of the symbol display area, and display mode of the window frame display area may be changed when the game information is displayed in the first area.

In the gaming machine of the present invention, may further comprise: game start instruction means (for example, the start lever 10 mentioned later) for instructing a start of the game; and internal winning combination determination means (for example, the CPU 43 mentioned later) for determining an internal winning combination based on a game start instruction command from the game start instruction means; wherein the display control means may conduct displaying concerning with a specific winning combination (for example, bonuses such as BB or RB mentioned later) as the game information when the internal winning combination determination means determines the specific winning combination as the internal winning combination.

In the gaming machine of the present invention, the game result display means includes first display means and second display means arranged at a more front side than a display area of the first display means when seen from a front side of the gaming machine and the second display means has a symbol display area capable of transmittably displaying a display result of the first display means therethrough, and the display control means is provided, the display control means controlling the second display means so as to move and display game information from a first area including the symbol display area to a second area not including the symbol display area. Thereby, the game information is moved from an area including a display area to which the player's eyes are easily concentrated, thus the game information attracts attention of the player and it can be conducted notification easy to understand for the player by changing display mode which is understandable for the player because the game information is only moved.

BRIEF DESCRIPTION OF THE DRAWINGS

FIGS. 7A and 7B are explanatory views for explaining function of the LED lamps and fluorescent lamps.

DETAILED DESCRIPTION OF THE INVENTION

Figure 1:
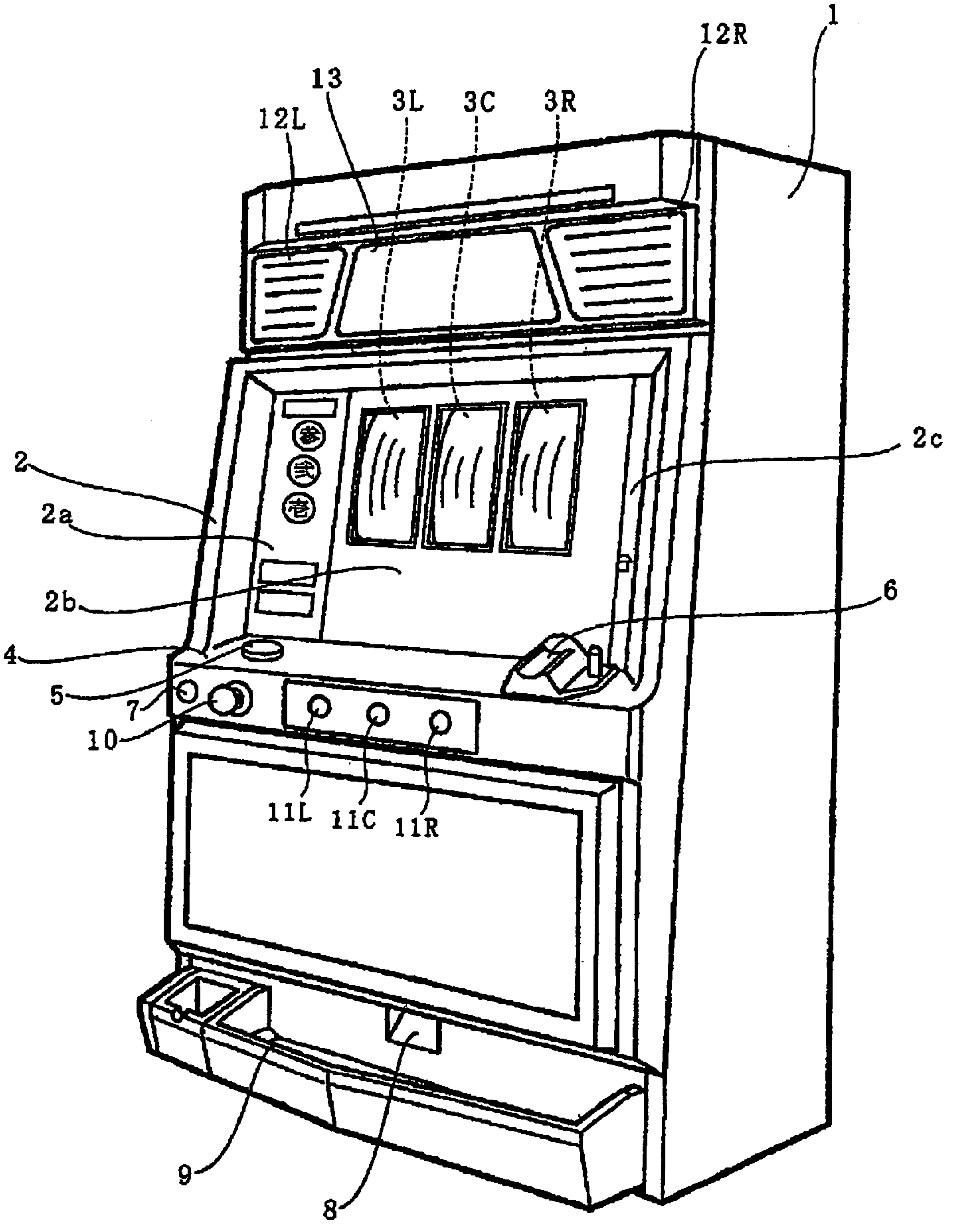
FIG. 1 is a perspective view of a slot machine according to the embodiment.

FIG. 1 is a perspective view showing an outlined shape of a gaming machine 1 according to one embodiment of the present invention. Here, the gaming machine 1 is a so-called Japanese pachi-slot machine. Though, in the gaming machine 1, a player plays games by using game media such as coins, medals or tokens, or a card in which information of game value given to the player is stored, it will be described hereinafter the gaming machine 1 in which medals are used.

Presently, the Japanese pachi-slot machine in the main current has a plural kinds of winning modes. In particular, when a predetermined winning combination is accepted, the player can obtain a more beneficial gaming state than a normal gaming state for a predetermined period without finishing the game by only one payout of medals. As such winning combination, there exist one winning combination in which the game relatively giving large benefit to the player can be done in predetermined times (this winning combination is called "BIG BONUS" and abbreviated as "BB" hereinafter) and another winning combination in which the game relatively giving small benefit to the player in predetermined times (this winning combination is called "REGULAR BONUS" and abbreviated "RB" hereinafter).

And in the Japanese pachi-slot machine in the main current, in order to materialize the winning combination that medals or coins are paid out when a predetermined symbol combination stands side by side along pay lines made activated (abbreviated as "activated line" hereinafter), it is required to internally win the winning combination (abbreviated as "internal winning" hereinafter) by the internal lottery treatment (abbreviated as "internal lottery" hereinafter) and to conduct stop operation of the symbols by the player at the timing that the symbol combination indicating the winning combination internally won (abbreviated as "internal winning combination" hereinafter) can stop along the activated lines. That is to say, even if the winning combination is internally won, the winning according to the internal winning combination cannot be realized when the stop operation by the player is out of the timing. Namely, in the present Japanese pachi-slot machine in the main current, it is required technique to conduct stop operation of the symbols at good timing. This technique is called "observation push", thus it is highly appreciated the technical intervention in the present Japanese pachi-slot machine.

At the front surface of a cabinet 2 entirely forming the gaming machine 1, a panel display unit 2*a*, a liquid crystal display unit 2*b* and a fixed display unit 2*c*, which have substantially vertical planes, are formed. As for the panel display unit 2*a*, the liquid crystal display unit 2*b* and the fixed display unit 2*c*, they will be described with reference to FIG. 2, hereinafter. In the cabinet 2 (at the rear side of the liquid crystal display unit 2*b*), three reels 3L, 3C, 3R (the first display means comprising the game result display means), on each outer periphery of which symbol line comprising a plural kinds of symbols is described, are rotatably arranged along a horizontal line. The reels 3L, 3C, 3R form the variable display means. Symbols on each reel (rotational drum type display device) can be seen through symbol display areas 21L, 21C, 21R (shown in FIG. 2 hereinafter). Each reel is constructed so as to be able to rotate at a constant rotational speed (for example, 80 rotations/minute).

At a lower position of the panel display unit 2*a*, the liquid crystal display unit 2*b* and the fixed display unit 2*c*, a frontward projection portion 4 having a substantially horizontal plane is formed. At the left side of the frontward projection portion 4, it is arranged a BET switch 5 for betting medals credited by button pressing operation. At the right side of the frontward projection portion 4, a medal insertion slot 6 is formed. At the front left side of the frontward projection portion 4, it is provided a c/p switch 7 for switching credit/payout of medals obtained in the game by the player based on button pressing operation. On the basis of switching by the c/p switch 7, medals are paid out from a medal payout opening 8 and the paid medals are accumulated in a medal receiving tray 9.

At the right side of the C/P switch 7, a start lever 10 (game start instruction means operable by the player), which starts rotation of the reels when operated by the player and starts variable display of the symbols (starts the game) within each of the symbol display areas 21L, 21C, 21R (see FIG. 2), is provided so as to be able to rotate within a predetermined angle. At the front center of the frontward projection portion 4 and the right side of the start lever 10, three stop buttons 11L 11C, 11R (game result leading means operable by the player), which is operated to stop rotation of the reels 3L, 3C, 3R, respectively, are arranged. At the upper left and right sides of the cabinet 2, speakers 12L, 12R are arranged. Between the speakers 12L, 12R, a payout table panel 13 which shows winning combinations of the symbols and the number of medals paid out as awards, is provided.

Figure 2:
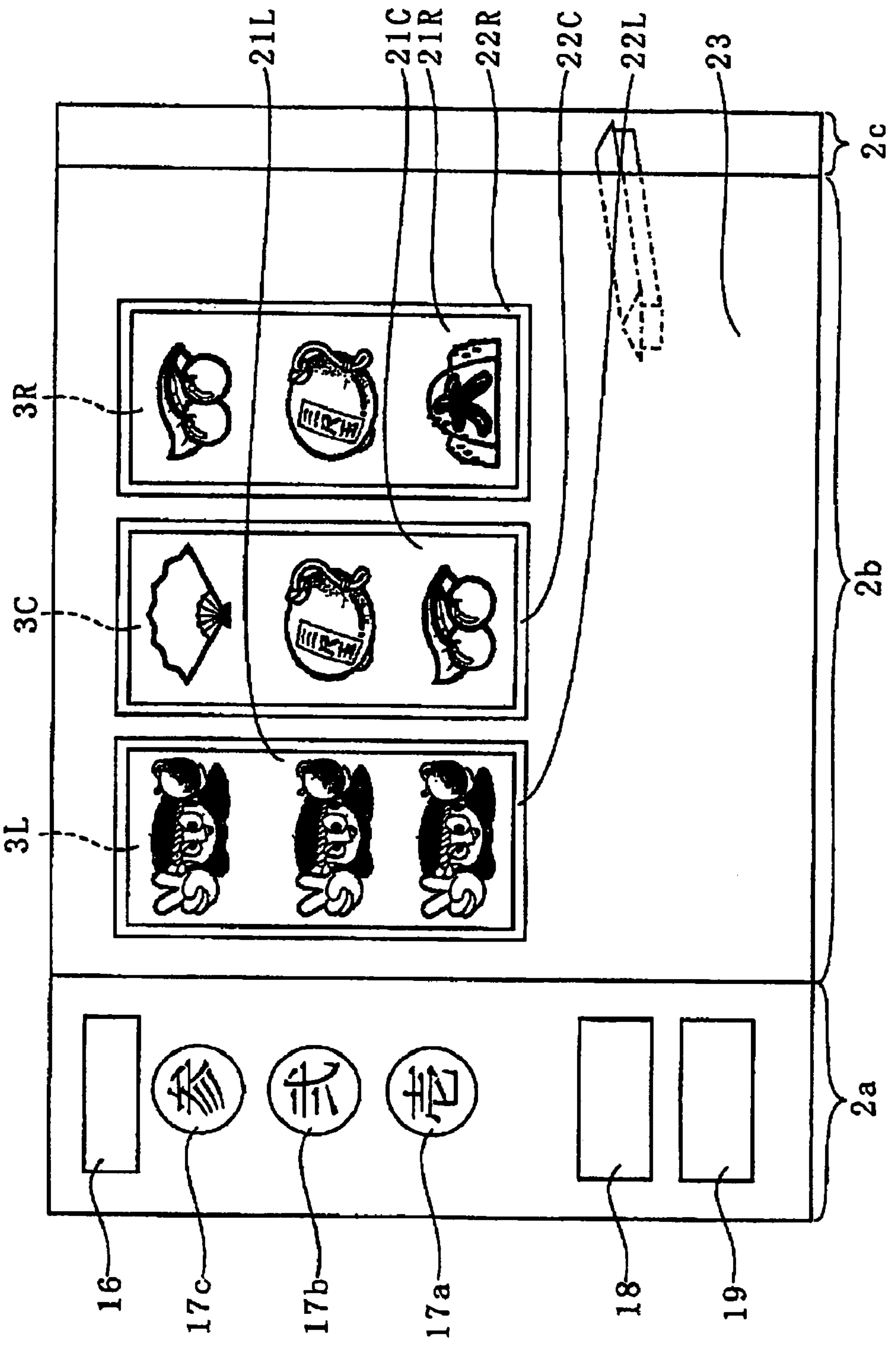
FIG. 2 is an explanatory view showing a panel display part and a liquid crystal display part.

With reference to FIG. 2, the panel display unit 2*a*, the liquid crystal display unit 2*b* and the fixed display unit 2*c* will be explained.

The panel display unit 2*a* comprises a bonus game information display part 16, BET lamps 17*a*~17*c*, a payout display part 18 and a credit display part 19. Here, the bonus display part 16 is constructed from 7-segment LEDs and displays the game information during the bonus game. The 1-BET lamp 17*a*, 2-BET lamp 17*b* and MAX-BET lamp 17*c* are turned on according to the medal number betted to conduct the game. The 1-BET lamp 17*a* is turned on when the betted medal number is "1". The 2-BET lamp 17*b* is turned on when the betted medal number is "2". And the MAX-BET lamp 17*c* is turned on when the betted medal number is "3". The payout display part 18 and the credit display part 19 are constructed from 7-segment LEDs respectively. The payout display part 18 displays the payout medal number when the winning is materialized. The credit display part 19 displays the medal number accumulated (credited).

The liquid crystal display unit 2*b* comprises the symbol display areas 21L, 21C, 21R, window frame display areas 22L, 22C, 22R and effect display area 23. The display contents displayed on the liquid crystal display 2*b* are variably changed according to the variable symbol display mode of the reels 3L, 3C, 3R, stop display mode of the symbols and operation of a liquid crystal display device 31 mentioned hereinafter.

The symbol display areas 21L, 21C, 21R are provided corresponding to the reels 3L, 3C, 3R, respectively, and display the symbols arranged on the outer periphery of the reels 3L, 3C, 3R and various effects thereon. Here, in a case that the reels 3L, 3C, 3R corresponding to the symbol display areas 21L, 21C, 21R are rotating or the stop buttons 11L, 11C, 11R corresponding to the symbol display areas 21L, 21C, 21R are in a operable state for stop operation of the reels 3L, 3C, 3R, each symbol display area 21L, 21C, 21R is transparently displayed so as to be able to easily recognize the symbols arranged on the outer peripheries of the reels 3L, 3C, 3R, and effect effected through still images or moving images by, for example, symbols, letters, figures, marks, characters is not displayed.

The window frame display areas 22L, 22C, 22R are formed so as to enclose each symbol display area 21L, 21C, 21R and represents the frames of the symbols arranged on the outer peripheries of the reels 3L, 3C, 3R.

The effect display area 23 is formed in an area other than the symbol display areas 21L, 21C, 21R and the window frame display areas 22L, 22C, 22R in the liquid crystal display unit 2*b*. This effect display area 23 displays the image (representing so-called "WIN LAMP") conclusively indicating that bonus winning is realizable, the effect to increase interest for games and the information necessary for the player to beneficially advance the game.

The fixed display unit 2*c* is an area to display the images determined beforehand. Concretely, the fixed display unit 2*c* displays "a part of row houses" which is described on a display plate 33 mentioned hereinafter. By combining the image displayed on the fixed display unit 2*c* and the image displayed on the effect display area 23, one still image or moving image can be displayed. In the embodiment, one complete image of the row houses can be displayed.

Further, with reference to FIGS. 3 and 4, LED lamps 29 arranged in the reels 3L, 3C, 3R will be described. The LED lamps 29 function as illumination means for illuminate the symbols arranged on the outer peripheries of the reels 3L, 3C, 3R and one of illumination means for illuminating the areas mainly corresponding to the symbol display areas 21L, 21C, 21R within an area of a liquid crystal panel 34 (mentioned later). Thus, the LED lamps 29 function as common illumination means for commonly illuminating the above symbols and the areas. And the LED lamps 29 also function as rear illumination means for illuminating the first display means from the backside thereof.

Figure 3:
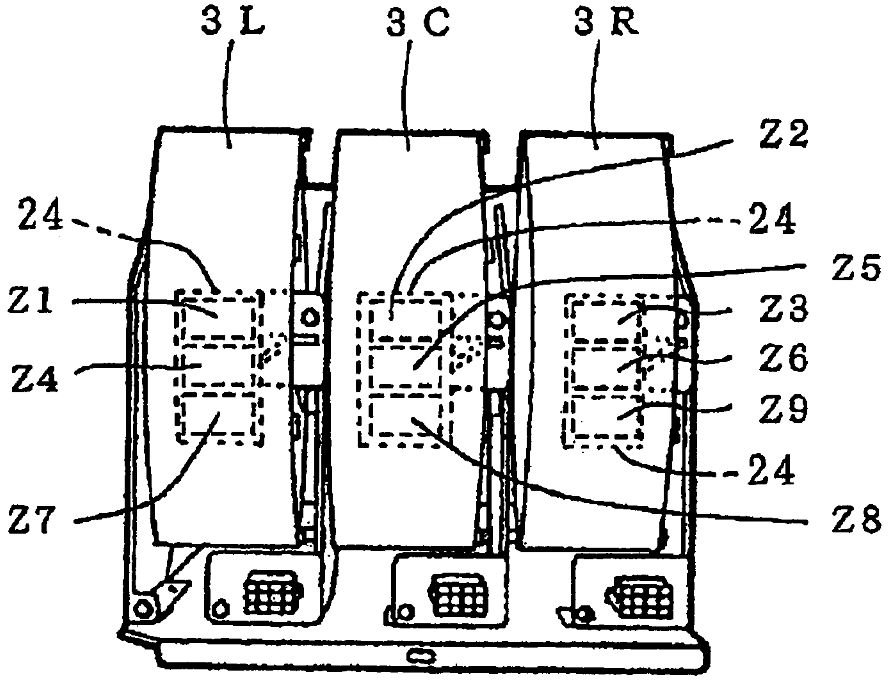
FIG. 3 is an explanatory view showing an external appearance of a reel mechanism in which lamps are arranged within each reel.

As shown in FIG. 3, in the reels 3L, 3C, 3R, there are arranged LED receiving circuit boards 24 which are positioned behind the symbols of three symbol lines (totally nine symbols), each symbol line appearing in each of symbol display areas 21L, 21C, 21R when rotation of the reels 3L, 3C, 3R stops. Each LED receiving circuit board 24 has three LED receiving portions in each of which a plurality of LED lamps 29 are provided. Hereinafter, among nine LED receiving portions, the LED receiving portion is serially represented by Z1, Z2 and Z3 from the left portion in the horizontal upper line, the LED receiving portion is serially represented by Z4, Z5 and Z6 from the left portion in the horizontal center line and the LED receiving portion is serially represented by Z7, Z8 and Z9 from the left portion in the bottom horizontal line. The LED lamp 29 illuminates the rear side of the reel sheet by white light, the reel sheet being attached to the reel 3L, 3C, 3R along the outer periphery thereof. The reel sheet is made translucent, thus light emitted from the LED lamp 29 permeates to the front plane of the reel sheet.

Figure 4:
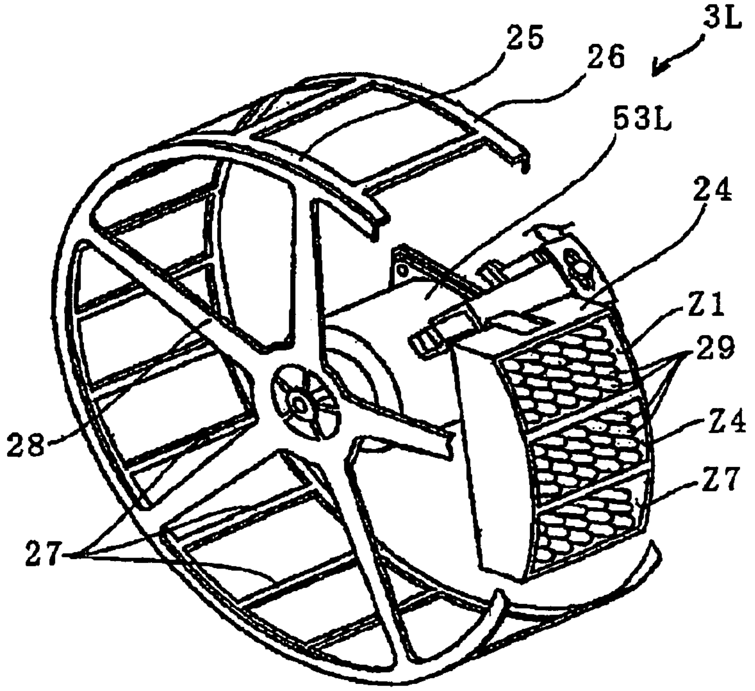
FIG. 4 is a perspective view showing a reel and a circuit board for receiving LEDs therein arranged in the reel.

As shown in FIG. 4, the reel 3L is constructed from a cylindrical frame construction in which two circular frames 25 and 26 with the same shapes are connected by a plurality of connecting members 27 while separating with a distance (corresponding to the reel width) therebetween, and transmitting members 28 for transmitting driving force of a stepping motor 53L (see FIG. 8) arranged in the center position of the frame construction to the circular frames 25 and 26. Here, the reel sheet attached to the outer periphery of the reel 3L is omitted.

The LED receiving circuit board 24 arranged within the reel 3L has three LED receiving portions Z1, Z4 and Z7, each receiving a plurality of LED lamps 29. The LED receiving circuit board 24 is arranged so that the LED receiving portions Z1, Z4, Z7 position at rear sides of the symbols (totally three symbols), respectively, the symbols being seen through the symbol display area 21L by the player. Here, though the reels 3C and 3R are not shown, both reels have the same construction and the LED receiving circuit board 24 is arranged within each reel.

Figure 5:
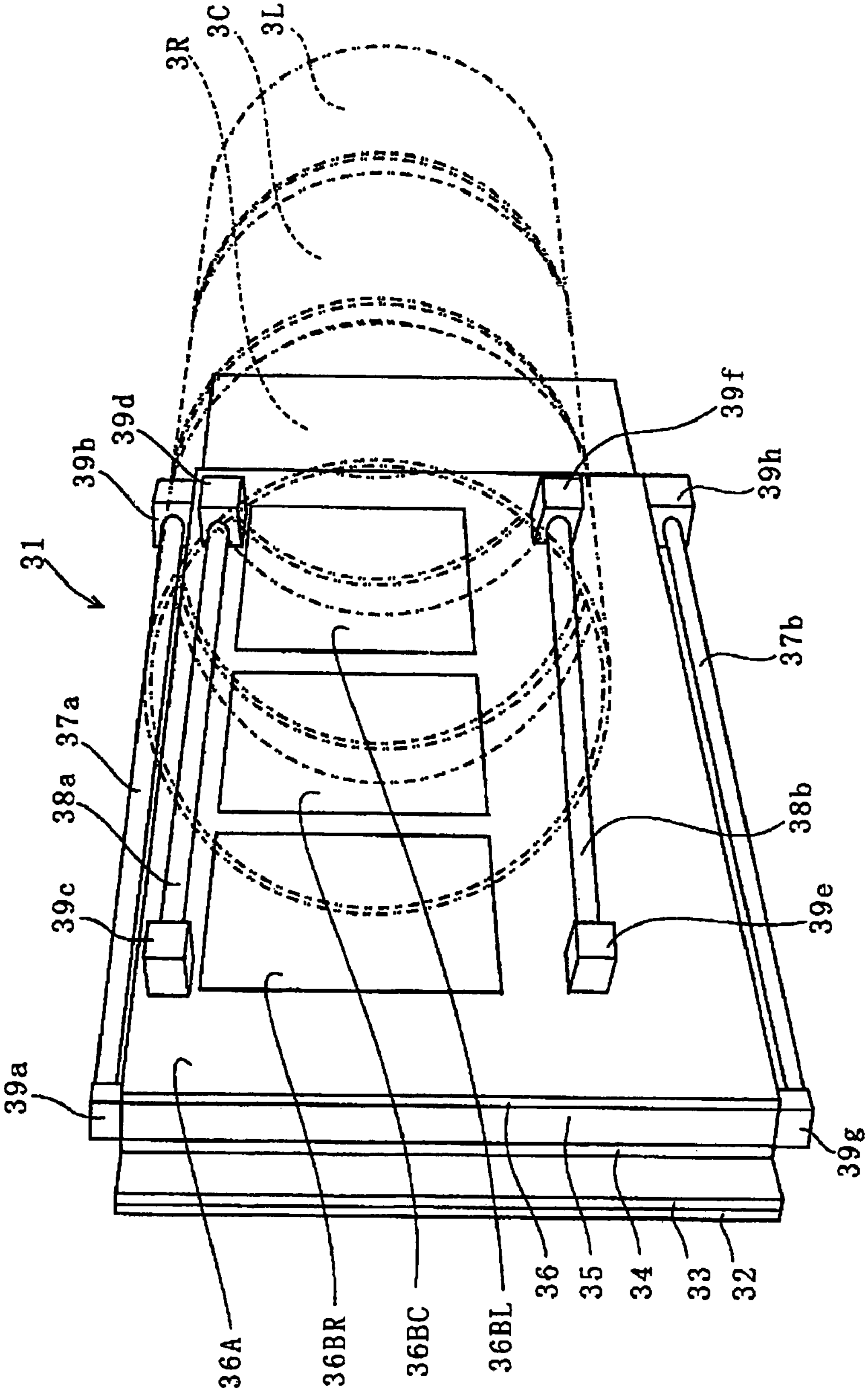
FIG. 5 is a perspective view roughly showing a construction of the liquid crystal display device.
Figure 6:
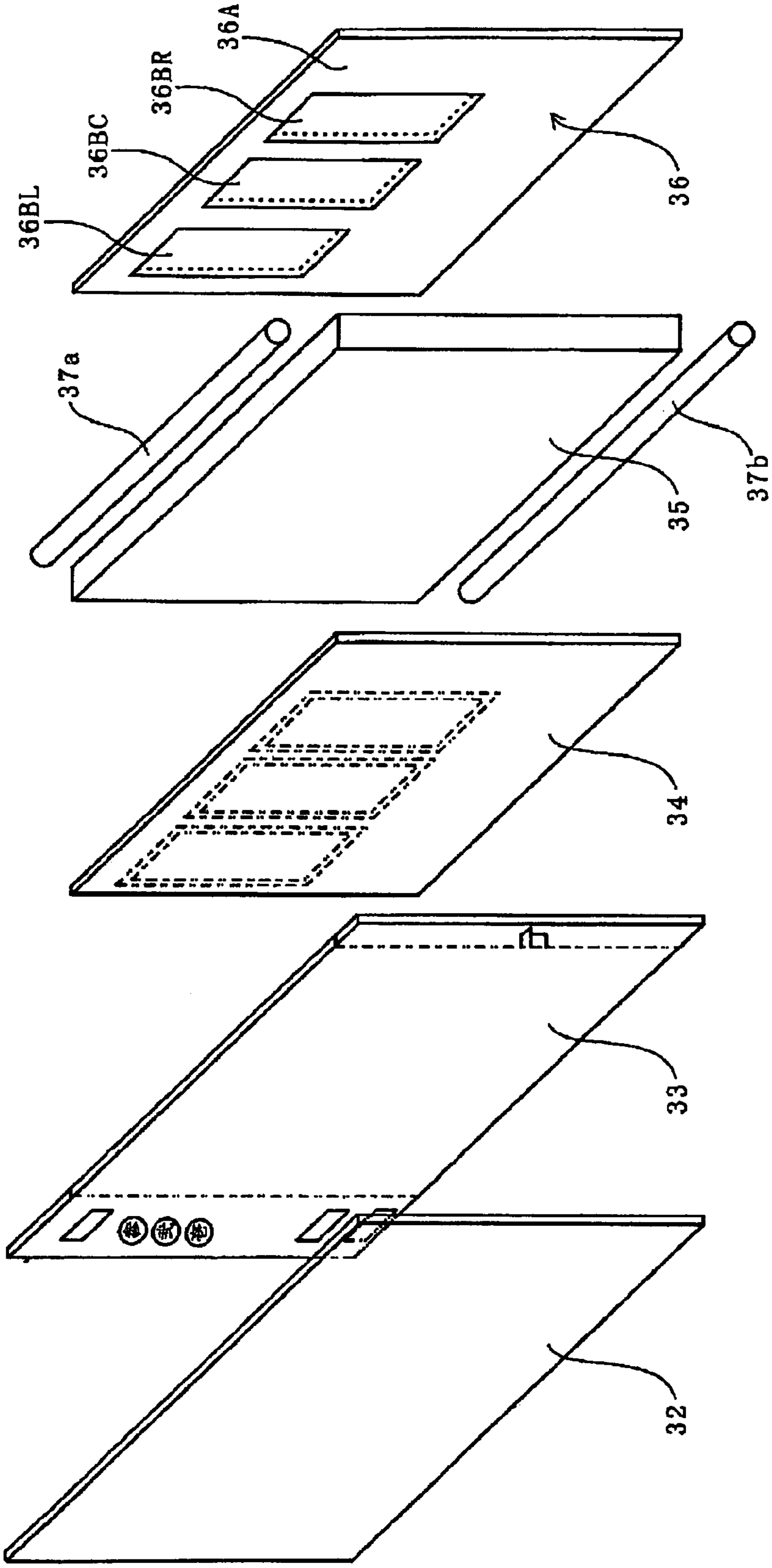
FIG. 6 is an exploded perspective view showing a part of the liquid crystal display device.

Next, with reference to FIGS. 5 and 6, a transmission type liquid crystal display device 31 (corresponding to the second display means constructing the game result display means) will be described. FIG. 5 is a perspective view (seeing from the rear side of the cabinet 2) showing outline construction of the liquid crystal display device 31. FIG. 6 is an exploded perspective view showing a partial construction of the liquid crystal display device 31.

The liquid crystal display device 31 is constructed from a protect glass 32, a display plate 33, a liquid crystal panel 34, a light guide plate 35, a reflection film 36, fluorescent lamps 37*a*, 37*b*, 38*a*, 38*b* functioning as so-called white light sources (capable of emitting light including light having all wavelengths with a predetermined ratio so that specific colors are inconspicuous to eyes of persons), lamp holders 39*a*~39*h* and a flexible circuit board (not shown) comprising a table carrier package (TCP) mounting an IC for driving the liquid crystal panel, the TCP being connected to a terminal portion of the liquid crystal panel 34. The liquid crystal display device 31 is arranged at a more front side than the display areas of the reels 3L, 3C, 3R (more front side than the display planes thereof) so as to spread over the reels 3L, 3C, 3R. And the reels 3L, 3C, 3R and the liquid crystal display device 31 are independently arranged (with a predetermined distance therebetween).

The protect glass 32 and the display plate 33 are made of light transmittable material. The protect glass 32 is provided with an object to protect the liquid crystal panel 34. At the areas corresponding to the panel display unit 2*a* of the display plate 33 and the fixed display unit 2*c*, images are described. Here, various display parts positioned at the rear side of the area in the display plate 33 corresponding to the panel display unit 2*a* and electric circuits for operating the BET lamps 17*a*~17*c* are omitted to show.

The liquid crystal panel 34 is formed by filling liquid crystal material in clearance formed between the transparent plate such as a glass plate on which thin film transistor layer is formed and the transparent plate facing thereto. The display mode of the liquid crystal panel 34 is set to normally white. Here, "normally white" means a construction that the liquid crystal panel 34 becomes in a white display state (light can advance toward the display plane, that is, light transmitted can be seen from outside) when the liquid crystal panel 34 is not driven. By utilizing the liquid crystal panel 34 constructed to have the normally white mode, the symbols (variable display and stop display of the symbol display parts) arranged on the reels 3L, 3C, 3R can be seen and recognized through the symbol display areas 21L, 21C, 21R even if it occurs a trouble that the liquid crystal panel cannot be driven. Thereby, the player can continue the game. That is to say, if the above trouble occurs, it can be conducted the game based on the basic function such as the variable display and the stop display of the reels 3L, 3C, 3R.

The light guide plate 35 is arranged at the rear side of the liquid crystal panel 34 in order to lead the light emitted from the luminescent lamps 37*a*, 37*b* to the liquid crystal panel 34 (to illuminate the liquid crystal panel). For example, the light guide plate 35 is constructed from the light transmittable member with thickness of about 2 cm (having light transmitting ability) made of acrylic resin.

As the reflection film 36, for example, it is used the member that silver deposition layer is formed on white polyester film or aluminium thin film. The reflection film 36 reflects light led to the light guide plate 35 toward the front side thereof This reflection film 36 is constructed from a reflection area 36A and non-reflection areas (non-transmittable areas) 36BL, 36BC, 36BR. The non-reflection areas 36BL, 36BC, 36BR are formed as the light transmittable areas which are made of transparent material and transmit the light led thereto without reflecting, and are arranged at each front position of symbols (totally three symbols) displayed when rotation of the reels 3L, 3C, 3R is stopped. In this case, areas corresponding to the reel sheet function as the light transmittable areas. Concretely, sizes and positions of the non-reflection areas 36BL, 36BC, 36BR coincide with those of the symbol display areas 21L, 21C, 21R. The reflection area 36A reflects the light led thereto and functions as one of the illumination means for the area mainly corresponding to the window frame display areas 22L, 22C, 22R and the effect display area 23 within the area on liquid crystal panel 34. According to the above construction, since the player can see and recognize variable display and stop display of the symbols in the symbol display areas through the light transmittable areas in reflection means, the player can enjoy the game based on the display mode in the symbol display areas and the liquid crystal display device.

The fluorescent lamps 37*a* and 37*b* are arranged along the upper edge and the lower edge of the light guide plate 35 and both ends of the fluorescent lamp 37*a*, 37*b* are supported by lamp holders 39. The fluorescent lamps 37*a* and 37*b* function as illumination means for the area mainly corresponding to the window frame display areas 22L, 22C, 22R and the effect display area 23 within the area on the liquid crystal panel 34. Namely, the fluorescent lamps 37*a* and 37*b* emit light led to the light guide plate 35 (the lamps separately lead light to the light guide plate 35).

And the fluorescent lamps 38*a* and 38*b* are arranged so as to face toward the reels 3L, 3C, 3R at the upper and lower positions on the rear side of the reflection film 36. The light, which is emitted from the fluorescent lamps 38*a* and 38*b* and reflected on the surface of the reels 3L, 3C, 3R, further entered in the non-reflection areas 36BL, 36BC, 36BR, illuminates the liquid crystal panel 34. Therefore, the fluorescent lamps 38*a* and 38*b* function as the illumination means for illuminating the symbols arranged on the reels 3L, 3C, 3R and one of the illumination means for the areas mainly corresponding to the symbol display areas 21L, 21C, 21R within the area on the liquid crystal panel 34. The fluorescent lamps 38*a* and 38*b* function as common illumination means for illuminating both the above symbols and areas. Further, the fluorescent lamps 38*a* and 38*b* also function as the forward illumination means for illuminating the first display means from the front side thereof.

As mentioned above, the first display means and the second display means are commonly illuminated by the common illumination means. That is to say, since not only the first display means but also the second display means are illuminated by the light emitted from the common illumination means, cost becomes cheaper than a case that the illumination means is independently arranged for each display means. Further, by controlling the common illumination means illumination control can made simple and the same illumination for two display means can be also realized at the same time.

Next, with reference to FIG. 7, function of the LED lamp 29 and the fluorescent lamps 37*a*, 37*b*, 38*a*, 38*b* will be described. In FIG. 7, moving direction of the emitted light from the lamp is shown by arrows.

FIG. 7 (1) schematically shows function of each lamp when the liquid crystal existing at the symbol display areas 12L, 21C, 21R is not driven (voltage is not added between the transparent plates of portions corresponding to the symbol display areas in the liquid crystal panel 34).

A part of the light emitted from the fluorescent lamps 38*a*. 38*b* is reflected on the reel sheet. And a part of the light emitted from the LED lamps 29 arranged on the LED receiving circuit board 24 penetrates through the reel sheet. Since the above light penetrates through the non-reflection areas 36BL, 36BC, 36BR, the light guide plate 35 and the liquid crystal panel 36 both of which constructs the liquid crystal display device 31, the player can see and recognize the symbols arranged on the reels. Therefore, in a case that the liquid crystal existing at the symbol display areas 12L, 21C, 21R is not driven, the LED lamps 29 and the fluorescent lamps 38*a*, 38*b* function as the illumination means for the symbols arranged on the reels 3L, 3C, 3R.

On the contrary, the light emitted from the fluorescent lamps 37*a*, 37*b* and led into the light guide plate 35 penetrates through the liquid crystal panel 34 and enters in eyes of the player. That is, the fluorescent lamps 37*a*, 37*b* function as the illumination means for the area in the liquid crystal panel 34 corresponding to the above window frame display areas 22L, 22C, 22R and the effect display area 23.

FIG. 7 (2) schematically shows function of each lamp when the liquid crystal existing at the symbol display areas 12L, 21C, 21R is driven (voltage is added between the transparent plates of portions corresponding to the symbol display areas in the liquid crystal panel 34).

A part of the light emitted from the fluorescent lamps 38*a*, 38*b* is reflected on the reel sheet. And a part of the light emitted from the LED lamps 29 penetrates through the reel sheet. Since a part of the above light is reflected on or absorbed in or penetrated through the areas that the liquid crystal is driven within the area of the liquid crystal panel 34, the player can see and recognize the effect display and the like displayed on the symbol display areas 21L, 21C, 21R. Therefore, in a case that the liquid crystal existing at the symbol display areas 12L, 21C, 21R is driven, the LED lamps 29 and the fluorescent lamps 38*a*, 38*b* function as the illumination means corresponding to the symbol display areas 21L, 21C, 21R within the area of the liquid crystal panel 34.

Here, in a case that a part of the areas corresponding to the symbol display areas 21L, 21C, 21R within the area of the liquid crystal panel 34 is driven, the LED lamps 29 and the fluorescent lamps 38*a*, 38*b* function as the illumination means for the symbols arranged on the reels 3L, 3C, 3R and for the areas corresponding to the liquid crystal not driven in the symbol display areas 21L, 21C, 21R within the liquid crystal panel 34.

Figure 8:
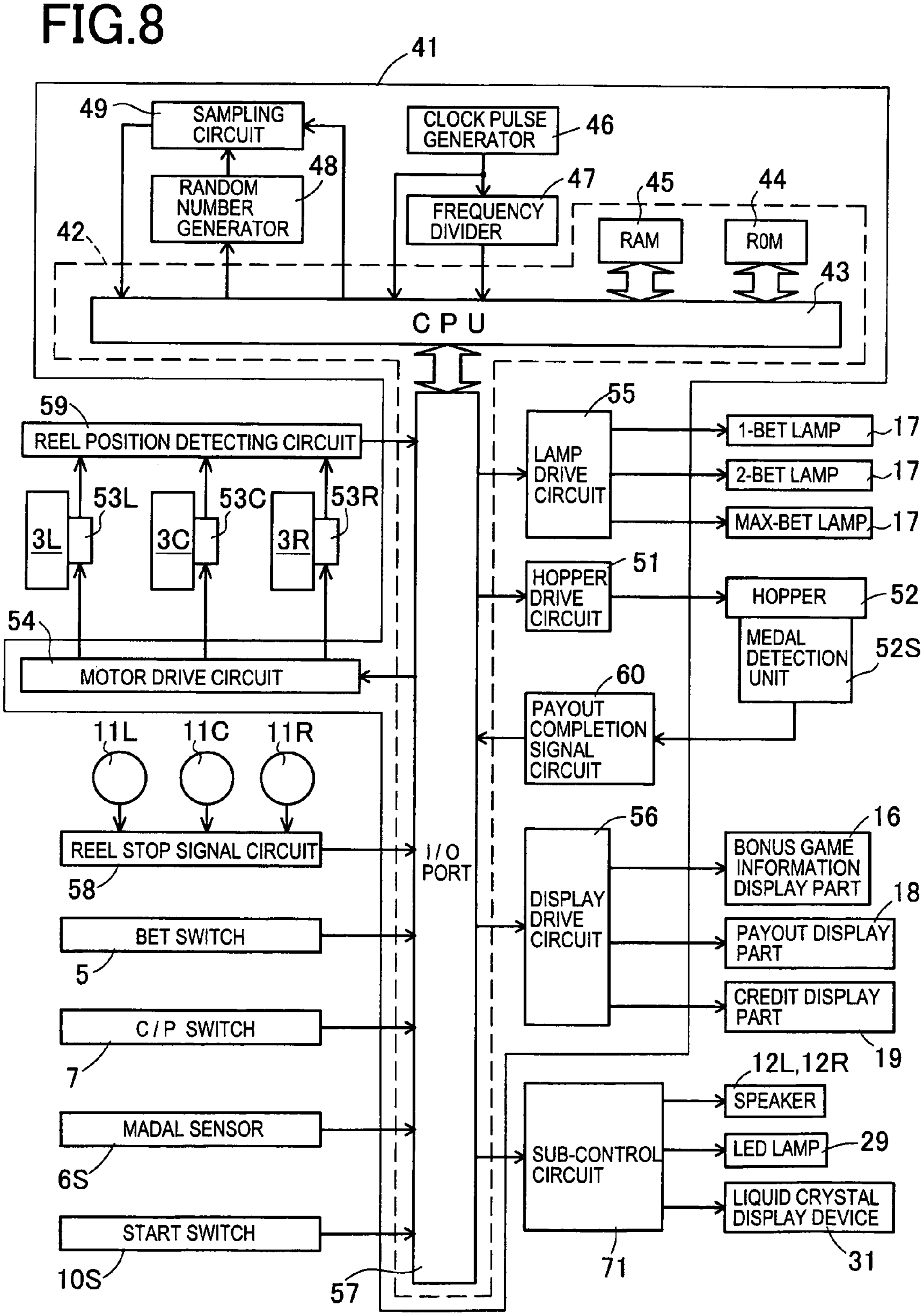
FIG. 8 is a block diagram showing an electrical circuit in the embodiment.

FIG. 8 shows the circuitry construction including a main control circuit 41 for controlling game treatment operation in the gaming machine 1, peripheral devices electrically connected to the main control circuit 41, and a sub-control circuit 71 for controlling the liquid crystal display device 31 and speakers 12L, 12R based on the control command transmitted from the main control circuit 41. The main control circuit 41 and the sub-control circuit 71 construct the game result display control means. The main control circuit 41 has functions as the internal winning combination determination means, the first display control means and the beneficial state producing means. The internal winning combination determination means determines the internal winning combination among plural winning combinations based on the output from the game start instruction means. The first display control means controls the first display means based on the determined result by the internal winning combination determination means and the output by the game result leading means. The beneficial state producing means produces beneficial state for the player when a predetermined game result is displayed on the game result display means. And the sub-control circuit 71 controls the second display means based on the determined result by the internal winning combination determination means and the output from the game result leading means.

The main control circuit 41 is mainly constructed from a microcomputer 42 arranged on the circuit board, in addition to a circuit for sampling random number. The microcomputer 42 includes a CPU 43 conducting control operation according to preset program, a ROM 44 and a RAM 45.

To the CPU 43, a clock pulse generator 46 generating reference clock pulses, a frequency divider 47, a random number generator 48 for generating random numbers sampled and a sampling circuit 49 are connected respectively. Here, as the means for sampling random number, it may construct that random number sampling is done according to the operation program of the CPU 43 in the microcomputer 42. In this case, the random number generator 48 and the sampling circuit 49 may be omitted, or these may be remained to back up random number sampling operation.

In the ROM 44 of the microcomputer 42, there are stored a probability lottery table utilized for judging random number sampling conducted every operation of the start lever 10 (start operation), a stop control table for determining stop combination of the reels according to operation of the stop buttons and various control instructions (commands) to transmit to the sub-control circuit 71. Here, the sub-control circuit 71 never transmits commands, information and the like to the main control circuit 41, but one-way transmission from the main control circuit 41 to the sub-control circuit 71 is only done.

In the circuit of FIG. 8, as main actuators controlled based on control signal from the microcomputer 42, there are various lamps (1-BET lamp 17*a*, 2-BET lamp 17*b*, MAX-BET lamp 17*c*), various display parts (bonus game information display part 16, payout display part 18, credit display part 19), a hopper 52 as the game value giving means (including drive part for payout) accumulating medals and paying out a predetermined number of medals according to instruction by a hopper drive circuit 51 and stepping motors 53L, 53C, 53R for driving the reels 3L, 3C, 3R to be rotated.

A motor drive circuit 54 for driving and controlling the stepping motors 53L, 53C, 53R, a hopper drive circuit 51 for driving and controlling the hopper 52 and a lamp drive circuit 56 for driving and controlling various lamps and a display drive circuit 56 for driving and controlling display parts are connected to the output part of the CPU 43 through an I/O port 57. These drive circuits controls operation in each of the actuators when receiving control commands such as drive commands each of which is output from the CPU 43.

Further, as for the input signal producing means mainly producing input signals which are necessary for the microcomputer 42 to produce the control commands, there are provided the BET switch 5, the medal sensor 6S for detecting the inserted medals, the C/P switch 7, the start switch 10S, the reel stop signal circuit 58, the reel position detecting circuit 59 and the payout completion signal circuit 60. These are also connected to the CPU 43 through the I/O port 57.

The medal sensor 6S detects the medals inserted in the medal insertion slot 6. The start switch 10S detects operation of the start lever 10. The reel stop signal circuit 58 produces stop signal corresponding to operation of each stop button 11L, 11C, 11R. The reel position detecting circuit 59 provides signal to detect the position of each reel 3L, 3C, 3R with the CPU 43 when receiving pulse signal from the reel rotation sensor. The payout completion signal circuit 60 produces signal for detecting the medal payout completion when the count number (corresponding to the medal number paid out from the hopper 52) by the medal detection unit 52S reaches to data of a designated number.

In the circuit shown in FIG. 8, the random number generator 48 generates random numbers within a predetermined numeral range and the sampling circuit 49 conducts sampling of one random number at the suitable timing after the start lever 10 is operated. Based on the thus sampled random number and the probability lottery table stored in the ROM 44, the internal winning combination of the symbols is determined. And after the internal winning combination is determined, sampling of the random number is conducted again to select the "stop control table".

After rotation of the reels 3L, 3C, 3R is started, it is counted the number of the drive pulses each of which is provided with each of the stepping motors 53L, 53C, 53R, and the counted number is written in the predetermined area of the RAM 45. The reset pulse is generated from each of the reels 3L, 3C 3R every one rotation thereof, and these reset pulses are input to the CPU 43 through the reel position detecting circuit 59. Based on the thus obtained reset pulses, the count number of drive pulses counted in the RAM 45 is cleared to "0". Thereby, in the RAM 45, the count number corresponding to the rotational position within one rotation in each of the reels 3L, 3C, 3R is stored.

In order to connect the rotational positions of the reels 3L, 3C, 3R with the symbols described on the outer peripheries of the reels, a symbol table is stored in the ROM 44. In this symbol table, both code numbers, each of which is serially given every a predetermined rotational pitch of each reel 3L, 3C, 3R by setting the rotational position producing the reset pulse as the reference rotational position, and symbol codes, each of which indicates the symbol provided corresponding to each of the code numbers, are connected with each other.

Further, in the ROM 44, a winning symbol combination table is stored. In the winning symbol combination table, winning symbol combinations corresponding to various winnings, medal payout numbers each of which corresponds to each winning and winning determination codes each of which represents each winning, are corresponded with each other. The above winning symbol combination table is referred when the stop control of the left reel 3L, the center reel 3C and the right reel 3R is conducted and when the winning is confirmed after all reels 3L, 3C, 3R are stopped.

When one of winning combinations is internally won by the lottery treatment (probability lottery treatment) based on the above sampling of the random number, the CPU 43 sends stop signals for conducting stop control of the reels 3L, 3C, 3R to the motor drive circuit 54, based on the operation signals sent from the reel stop signal circuit 58 at the timing that the player operates the stop buttons 11L, 11C, 11R and the selected stop control table.

If the symbols stop in a stop mode that the winning combination internally won is realized, the CPU 43 provides the payout command signal to the hopper drive circuit 51, thereby a predetermined number of the medals are paid out from the hopper 52. At that time, the medal detection unit 52S counts the number of medals paid out, and when the number of medals paid out reaches to the designated number, the medal payout completion signal is input to the CPU 43. Thereby, the CPU 43 stops driving of the hopper 52 through the hopper drive circuit 51, as a result, the payout treatment of the medals is terminated.

Figure 9:
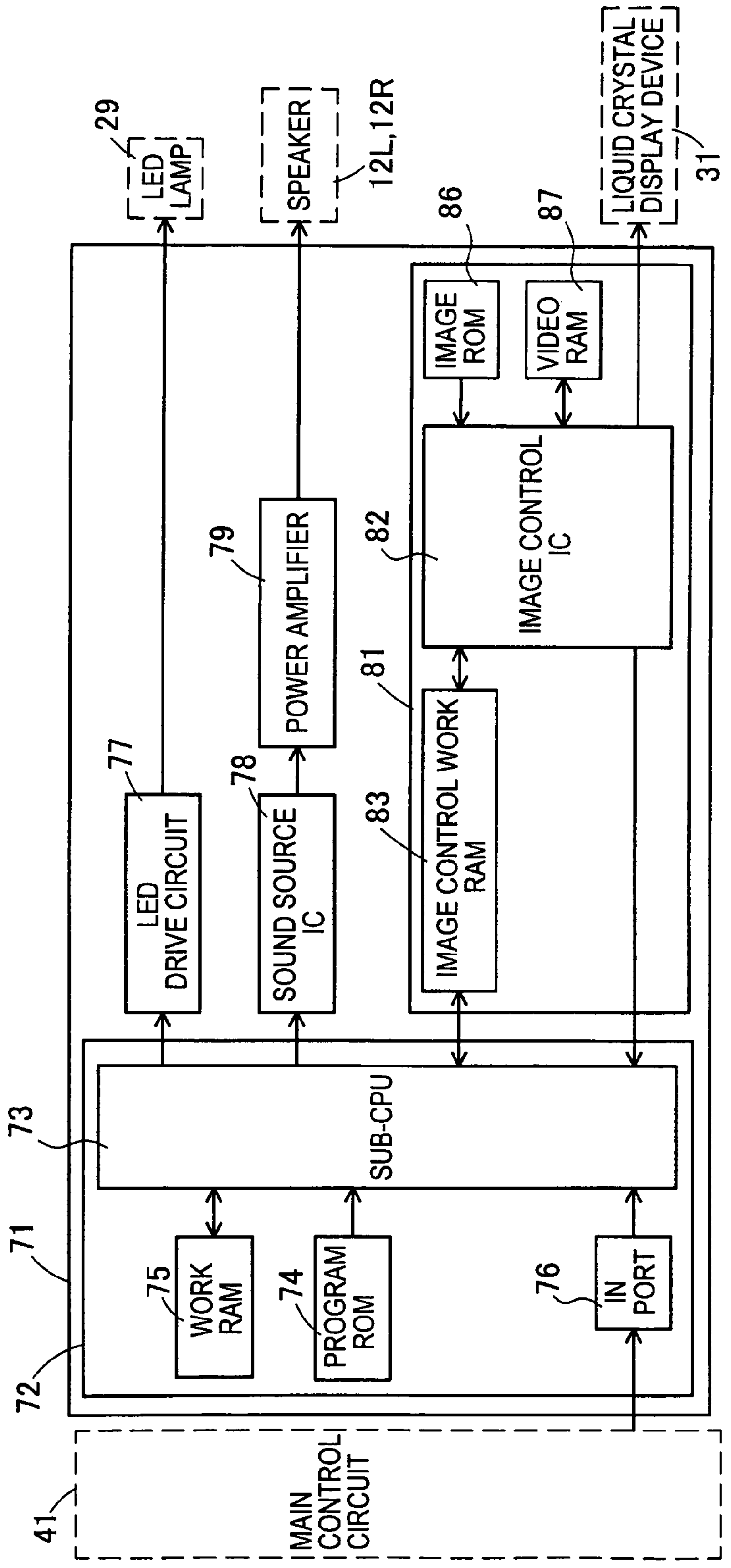
FIG. 9 is a block diagram showing a construction of a sub-control circuit.

FIG. 9 shows a construction of the sub-control circuit 71. The sub-control circuit 71 conducts turning on and off treatment of the LED lamps 29 based on the control command from the main control circuit 41, display control of the liquid crystal display device 31 and output control of sounds output from the speakers 12L, 12R. This sub-control circuit 71 is constructed on a separate circuit board from the circuit board on which the main control circuit 41 is formed and is mainly constructed from a microcomputer (abbreviated as "sub-microcomputer" hereinafter) 72. The sub-control circuit 71 is constructed from a LED drive circuit 77 as the display control means for controlling a plurality of ornamental lamps, the LED lamps 29 and the fluorescent lamps 37*a*, 37*b* which are arranged on the cabinet of the gaming machine 1, an image control circuit 81 as the display control means of the liquid crystal display device 31, a sound source IC 78 for controlling sounds output from the speakers 12L, 12R and a power amplifier 79 acting as the amplifier.

The sub-microcomputer 72 includes a sub-CPU 73 conducting control operation according to the control command sent from the main control circuit 41, a program ROM 74 acting as the memory means and a work RAM 75. Though the sub-control circuit 71 does not have the clock pulse generator, the frequency divider, the random number generator and the sampling circuit, it is constructed so that the random sampling is conducted in the operation program of the sub-CPU 73. And the program ROM 74 stores the control program executed in the sub-CPU 73. Further, the program ROM 74 also stores the image control program concerning with display on the liquid crystal display device 31 and various select tables. The work RAM 75 is constructed as the temporary memory means utilized when the control program is executed by the sub-CPU 73.

The image control circuit 81 is constructed form an image control work RAM 83, an image ROM 86, a video RAM 87 and an image control IC 82. The image control IC 82 determines the display contents displayed on the liquid crystal display device 31 based on parameters designated by the sub-CPU 73. The image control work RAM 83 is used for temporarily storing images when images are formed by the image control IC 82 and when images followingly displayed on the liquid crystal display device 31 are designated to the image control IC 82 by the sub-CPU 73. The image control IC 82 forms images corresponding to display contents determined by the sub-CPU 73 and outputs to the liquid crystal display device 31. The image ROM 86 stores various images to form the images to be displayed. And the video RAM 87 is constructed as the temporary memory means utilized when images are formed in the image control IC 82.

Figure 10:
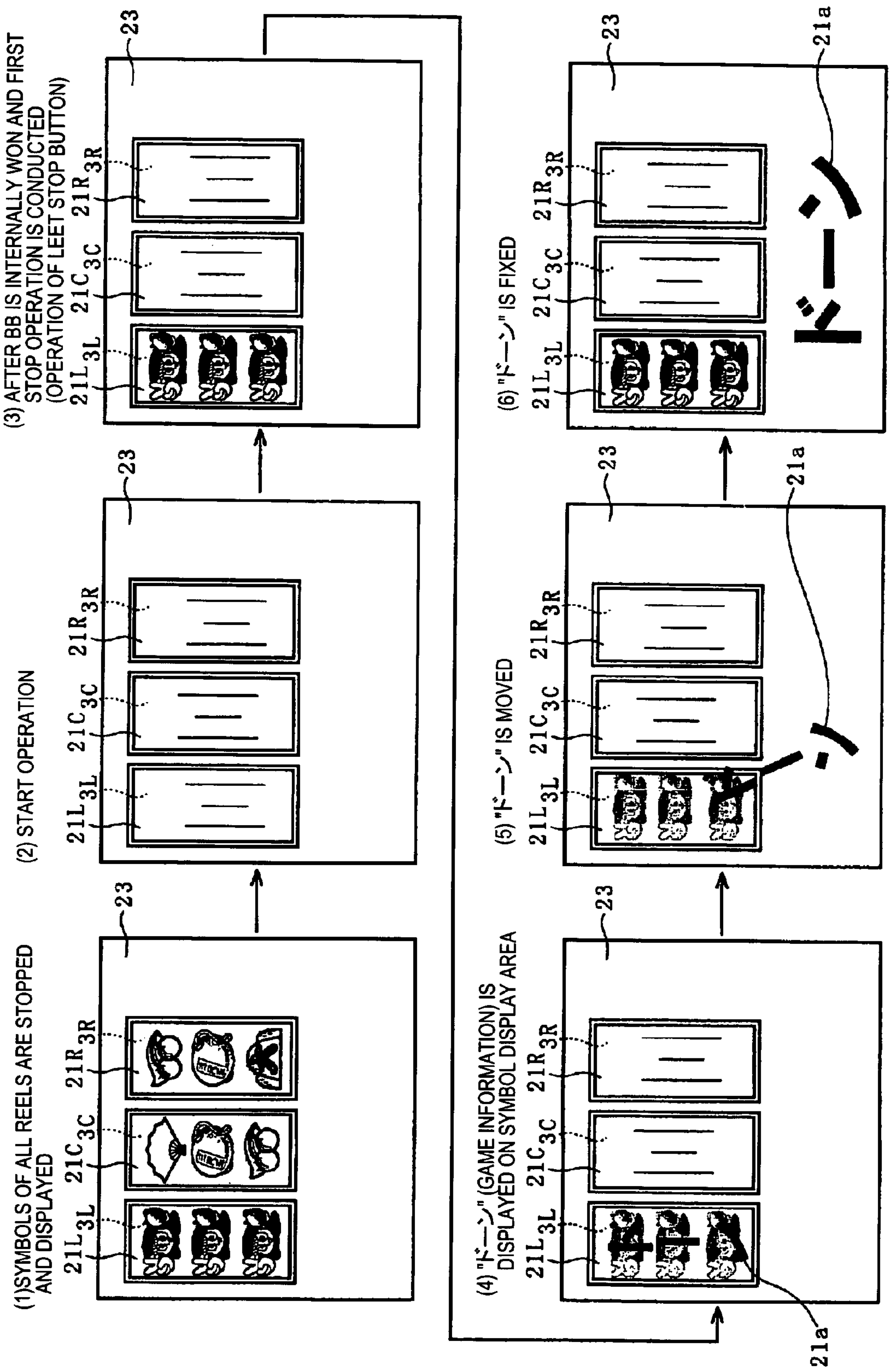
FIG. 10 is a view indicating in time series a display mode in the symbol display areas and the effect display area of the liquid crystal display unit in a case that BB is materialized or a case that there is possibility of materialization of BB.

FIG. 10 shows in time series a display mode in the symbol display area 21L, 21C, 21R of the liquid crystal display unit 2*b* and the effect display area 23 when BB is materialized or there is possibility of materialization of BB.

In FIG. 10 (1), the player sees the symbols, which are described on each of the reels 3L, 3C, 3R and variably moved, through the symbol display areas 21L, 21C, 21R of the liquid crystal display unit 2*b*. In this FIG., since the combination of stopped symbols is not the combination based on which BB or RB occurs, the game information is not displayed in the symbol display areas 21L, 21C, 21R or the effect display area 23.

In FIG. 10 (2), the player operates the start lever 10 and the reels 3L, 3C, 3R are variably moved (rotated).

In FIG. 10 (3), it is shown a display mode of the symbol display areas 21L, 21C, 21R and the effect display area 23, according to the case that the CPU 31 executes internal lottery by utilizing the random number which is sampled in the sampling circuit 37, and BB is internally won and the player pushes the stop button 11L as the first stop operation (operation in which the player first pushes one stop button voluntarily selected among the stop buttons 11L, 11C, 11R after the reels 3L, 3C, 3R are variably moved). Here, the stop symbols of the reel 3L are displayed as "Character-Character-Character (Don-Don-Don, here "Don" is the Character's name)"

In FIG. 10 (4), based on the internal winning of BB as explained in FIG. 10 (3), the game information of "ドーン (pronounced as "DOON")" 21*a* is displayed in the symbol display area 21L which is the display area corresponding to the reel 3L, thereby such game information is notified to the player.

Based on the above game information, impact can be given to the display mode (Don-Don-Don) of stopped symbols on the reel 3L in the first display means, thereby interest for games can be improved.

And in order to emphasize the information of "ドーン (DOON)" 21*a*, the stopped symbols (Don-Don-Don) is screened by "ドーン (DOON)" 21*a* when the player sees the symbol display area 21L. This is realized by changing light transmittance rate of the symbol display area.

In FIG. 10 (5), the notified game information of "ドーン" 21*a* is further moved at a predetermined timing after displaying thereof and is displayed over the symbol display areas 21L, 21C, 21R and the effect display area 23. This predetermined timing is a timing after a time, during which it is anticipated that the player can recognize the game information, is elapsed.

In FIG. 10 (6), the notified game information of "ドーン" 21*a* is further moved from the symbol display areas 21L, 21C, 21R to the effect display area 23 and is displayed only in the effect display area 23. And the game information of "ドーン" 21*a* is stopped and fixed at a predetermined position in the effect display area 23, that is, at the lower position of the symbol display areas 21L, 21C, 21R.

Thereby, the game information of "ドーン" 21*a*, which is the game information once displayed in the symbol display areas 21L, 21C, 21R, is moved from the symbol display areas 21L, 21C, 21R to the effect display area 23 at the predetermined timing. Therefore, since the player recognizes the game information and thereafter the recognized game information disappears (moves) from the symbol display areas 21L, 21C, 21R, the player can gaze only at the symbols displayed on the symbol display areas 21L, 21C, 21R, without moving eyes toward up and down and right and left directions.

As the modification of this embodiment, it may be changed the light permeability of the symbol display area (easy recognizability of the first display area) substantially at the same time when the game information is displayed or movingly displayed with a predetermined display mode. As the concrete example, the symbol display area may be controlled so as to have low light permeability (so that the first display area becomes hard to see) when the game information is displayed or movingly displayed with a predetermined display mode, thereby the game information is controlled so as to easily see. And the symbol display area may be controlled so as to have high light permeability when the game information is displayed or movingly displayed with a predetermined mode in the second display area, thereby the first display means is controlled so as to easily see.

When the game information is moved and displayed in the area including the symbol display area, it may be variably displayed the frame display area displayed in the second display area so as to enclose the symbol display area. Variable display of the frame display area may be conducted by enlargement, reduction, color change, movement, disappearance or blink thereof, and may be conducted so that predetermined figures, characters, letters, marks and the like are moved and displayed along the frame display area. Further, the frame display area may be changed so as to be constructed from a plurality of predetermined figures, characters, letters, marks and the like. Thereby, variegated effect display can be done and it can emphasize that the game information is displayed. Further, the display mode can be variably changed so as not to obstruct the game information.

Tempo or volume of the effective sounds or background sounds may be changed according to the moving display of the game information or the moving velocity thereof Thereby, presence can be increased, the game information is emphasized and effect becomes high.

Blinking mode of lamp-type display device may be continuously changed according to the moving display of the game information or the moving display velocity thereof. For example, blinking velocity or blinking period may be changed. Thereby, presence can be increased, the game information is emphasized and effect becomes high.

Display mode of the background images or character images in the second display device may be continuously changed according to the moving display of the game information or the moving display velocity thereof. Thereby, presence can be increased, the game information is emphasized and effect becomes high.

According to the above, the game information can be clearly recognized by the player as possible as he or she can. And in a case that the game information is moved to a place which does not superimpose with the first display means, it can, on the contrary, be constructed so that display in the first display means is clearly conducted, thus the player can surely confirm the information necessary at that situation of the game.

Further, as the modification of the above embodiment, when the game information is displayed in the area including the symbol display areas 21L, 21C, 21R, the display mode of the window frame display areas 22L, 22C, 22R formed at each periphery of the symbol display areas 21L, 21C, 21R may be changed. For example, blinking or changing in light color is preferable.

According to the above, it is preferable that display mode of the window frame display areas 22L, 22C, 22R is changed and light transmittance rate of the symbol display areas is changed, and further if display mode of the window frame display area is changed, the player's eyes can be directed to such window frame display areas 22L, 22C, 22R. Further, since light transmittance rate of the symbol display areas 21L, 21C, 21R can be changed, effect displaying with impact can be done and the player scarcely misses the game information According to the embodiment, it can be further obtained effects as follow.

Based on that the game information, which is grasped and confirmed by the player, is displayed near the symbol display area through which the first display area is seen and recognized, it is preferable because the player scarcely misses the game information. And since it is adopted the second display means positioned at the player's side, the game information is further understandable for the player. Further, since the second display means comprises variable display means, it can be conducted variegated effect displaying by variously changing display mode, such effect displaying not existing in the fixed display means.

And in the gaming machine, though the player watches the stopped symbols while considering whether the stopped symbols finally leads or easily leads to the specific game result if the stopped symbols are not final stopped symbols, it is preferable because the game information is displayed at the timing concerning with symbol stop to which attention of the player collects to the display means.

Further, when the game information is displayed, it is constructed so that light transmittance rate of the symbol display area (easiness to see the first display means) is changed. Thereby, for example, if light transmittance rate is made low (hard to see the first display means), game state can be surely confirmed without being disturbed by display of the first display means. And for example, if light transmittance rate is made high (easy to see the first display means), the player's eyes are directed to a direction for the symbol display area, thereby, at this point of view, the player scarcely misses the game information.

If the internal winning combination is determined to a specific winning combination, the game information concerning with the specific winning combination is displayed as the game information, thereby it can be raised the player's expectation that the beneficial state may immediately occur.

As mentioned, though description is explained according to the embodiment, the present invention is not limited to the above.

In the embodiment, although the game information is moved from the symbol display areas 21L, 21C, 21R to the effect display area 23, the present invention is not limited to this case. The game information may be moved from the effect display area 23 (another area) to the symbol display areas 21L, 21C, 21R. Thereby, the player can recognize the game information by stages. For example, if the game information is erroneous information, the game information may be displayed only in the effect display area 23 and if the game information is not erroneous information, the game information may be moved from the effect display area 23 to the symbol display areas 21L, 21C, 21R. Since the player gazes whether the game information is moved and displayed in the symbol display areas 21L, 21C, 21R or not, interest for games can be improved.

The above mentioned game information is not limited to letters of “ドーン”. For example, if the player can read and recognize, characters such as English characters, Hiragana characters or Kanji characters can be utilized, and numbers can be also utilized. Further, the game information is not limited to characters or numbers, and marks with characteristic shapes can be also utilized. As such marks, for example, characters (DONCHAN) appearing while gaming and concerning with a theme of the gaming machine or items (fan or cherry and the like) can be utilized.

Further, though the above game information is displayed when BB is internally won and the player pushes the stop button 11L, thereby it is notified to the player that BB is internally won, it is not limited to this case. For example, as the game information, it may be notified to the player information concerning with type of the gaming machine or so-called title for the type of the gaming machine, and it may be notified to the player or the clerk abnormality in the gaming machine, for example, comments indicating coin empty or abnormality of medal sensing in the medal sensor and the like. Further, when the game arcade in which the gaming machines are installed notifies events done therein, notifying comments may be utilized as the game information.

Display timing of the game information or moving timing of the displayed game information may be voluntarily selected. For example, based on display start or display end such as backup restoration, demonstration display waiting for players, errors or warning and the like after power is turned on and RAM is cleared, the game information can be displayed and moved substantially at the same time of display start or display end, or during a voluntary period that backup restoration, demonstration display waiting for players, errors or warning occurs. And the game information can be displayed and moved substantially at the same time of variable display start or end in the game result display means, the first display means, the symbol display means or specific symbol display means and the like, or during a voluntary period that such variable display is conducted.

Further, in the embodiment, though display timing of the game information is set when BB is internally won and the player pushes the stop button 11L, the present invention is not limited to this case. For example, at a stage of internal winning, the internal winning combination may be displayed in any one of the symbol display areas 21L, 21C, 21R or the symbol display area formed by combining the symbol display areas 21L, 21C, 21R. Here, the moving timing is also a timing after a time, during which it is anticipated that the player can recognize the game information, is elapsed. However, the moving timing includes a timing during so-called AT, AT being assistant period as the beneficial state for the player. And at the stage that stop order of the stop buttons is determined during AT, the stop order as the game information may be displayed in the symbol display areas 21L, 21C, 21R. Concretely, the stop order is displayed such as “123” or “312” and the like. Further, during AT, the internal winning combination may be notified. Concretely, “fan (including symbol display)” or “cherry (including symbol display)” and the like. At that time, the moving timing is also a timing after a time, during which it is anticipated that the player can recognize the game information, is elapsed.

And at the stage that stop order of the stop buttons is determined during AT, the stop order as the game information may be displayed in the symbol display areas 21L, 21C, 21R. As a result, when the reels 3L, 3C, 3R are moved and stopped, the above game information is displayed in the symbol display areas 21L, 21C, 21R substantially at the same time that the reels 3L, 3C, 3R are moved and stopped.

Further, during AT (including the state that stop order is notified and the state that stop order is not notified due to random number sampling), when the stop order is correct against each of the stop buttons 11L, 11C, 11R operated by the player, the letters “CORRECT!” and the pattern indicating character “DONCHAN” who is laughing are displayed in each of the symbol display areas 21L, 21C, 21R each of which corresponds to the stop buttons 11L, 11C, 11R, respectively. On the other hand, during AT, when the stop order is incorrect against each of the stop buttons 11L, 11C, 11R operated by the player, the letters “REGRETTABLE! INCORRECT!!” and the pattern indicating character “DONCHAN” who is crying are displayed in each of the symbol display areas 21L, 21C, 21R.

Further, if the title for the type of the gaming or version thereof is notified, it is better to notify such information while games are not done and to not notify while games are done. According to this, the player can understand the title for the type of the gaming or version thereof by only seeing the symbol display areas 21L, 21C, 21R when selecting the gaming machine. And if the information indicating abnormal state in the gaming machine is notified, it is better to notify such information in the symbol display areas 21L, 21C, 21R as soon as possible when abnormal state occurs. According to this, the player can immediately recognize that abnormal state occurs in the gaming machine and the clerk can immediately recognize problems occurring in the gaming machine. Thereby restoration of the gaming machine can be quickly conducted. Further, it is preferable to notify the game information such as abnormality not concerning much with games, for example, the information “remaining medals becomes a few” when the accumulated medals, for example, becomes a few except for medal empty, and to move at the above predetermined timing. Thereby, the player continues games while recognizing that medals accumulated in the gaming machine becomes a few and gazing at the symbol display areas 21L, 21C, 21R, and the clerk can anticipate abnormality for medal empty by seeing the game information “remaining medals becomes a few” which is displayed not only in the symbol display areas 21L, 21C, 21R but also in the effect display area 23. As a result, the clerk can correspond to medal empty which will occur thereafter. And if the clerk does not recognize the game information “remaining medals becomes a few”, the player recognizes such information. Therefore, the player can teach the clerk the game information “remaining medals becomes a few” so that the clerk can immediately correspond to medal empty which will occur thereafter.

Further, if events conducted in the game arcade are notified, it is better to notify the time of events. For example, when the game arcade notifies the set value (the value (for example, 95%, 100%, 110% and the like) which is determined by a medal number paid out to the player from the gaming machine against a medal number inserted in the gaming machine by the player) at 8:00 P.M. as a link in the chain of events, it is better to simultaneously notify the set value in the symbol display areas 21L, 21C, 21R. According to this, the player can easily understand the set value in the gaming machine while gaming. And if the predetermined time, that is, the time necessary for the player to recognize the set value, is elapsed, the set value is moved out of the symbol display areas 21L, 21C, 21R. Therefore, the game arcade can provide the information with impact to the player and the player can get the game information while seeing the symbol display areas 21L, 21C, 21R.

And the above game information may be variably displayed. Concretely, it is better that the displayed information (letters, numerals or marks) is changed in shape or color thereof according to time elapsing. According to this, although the player does not always gaze the game information in a case of still images, the player gazes the game information in a case of moving images which change according to time elapsing. As a result, the game information can be effectively notified.

In the above mentioned embodiment, though the game information is displayed by letters, the present invention is not limited to this. For example, patterns such as fireworks and the like may be utilized in stead of "ドーン" 21*a*. And mutual switching of "ドーン" 21*a* and the fireworks, or the moving display velocity or adjustment of the stop display time of the predetermined game information may be properly done by external operation (operation by a clerk in the game arcade or the player or a business person of the gaming machine). Since it is constructed that the clerk or the player is able to artificially operate the moving display velocity or the stop display time of the second display means, the display mode suitable for the game arcade or each player can be selected, thus it is preferable therefor.

In the above mentioned embodiment, though "ドーン" 21*a* is displayed in the symbol display areas 21L, 21C, 21R or the effect display area 23, the present invention is not limited to this. For example, it may be displayed as the predetermined game information letters or symbols (letters or symbols corresponding to the internal winning combination) to be notified to the player, title for the type of gaming machine, abnormality notification (coin empty or abnormality in the medal sensor 6S and the like) and information display (event information conducted in the game arcade) and the like.

Further, the notifying mode may be changed according to the internal winning combination (small combination such as a cherry or a fan). For example, colors or shapes of the displayed letters or symbols may be changed, and the game information may be variably changed with enlargement or reduction according to movement thereof. And even in a case that the same game information is displayed, one display mode may be selected among plural display modes and the game information may be displayed according to the selected display mode. For example, it is conceivable that the game information can be displayed by various display modes such as: the mode in which the game information is gradually enlarged; the mode in which the game information is gradually reduced; the mode in which the game information is gradually rotated, and the game information may be displayed according to one mode among the mentioned modes if necessary. Previously, the game information is merely displayed by stop display mode. But, the game information can be displayed with variety according to the above.

And, display of the above mentioned game information may be done in the reels 3L, 3C, 3R or the display area near thereto, in addition to the symbol display areas 21L, 21C, 21R.

Further, the game information may be displayed in the symbol display areas 21L, 21C, 21R in spite that the reels 3L, 3C, 3R are moved or not moved.

And, though the moving velocity of the game information is made different, the present invention is not limited to this. When the predetermined game information such as, for example, the small combination of cherry or fan is notified, it is better that the moving display velocity of the predetermined game information is made fast within the symbol display areas 21L, 21C, 21R and is made slow within the effect display area 23. Thereby, it concludes that the predetermined game information is displayed in the effect display area 23 in nearly all of time-frame, therefore it is not substantially interrupted the display of the reels 3L, 3C, 3R, which the player substantially always gazes, as a result, curious feelings is not given to the player.

In the embodiment, though the symbol display portions are formed every reel which displays a plurality of symbols while rotating, the present invention is not limited to this. For example, one symbol display area may be formed in the second display means corresponding to one or plural or all of plural reels (plural variable display parts) each of which displays a plurality of symbols while rotating. Entire area of the second display means may construct the symbol display area. The size thereof may be changed.

It is enough that the symbol display area can display symbol of the first display means, and may be constructed from only member capable of displaying symbols (transparent glass or transparent resin) in which liquid crystal is not provided in the symbol display area.

It may be provided the third display control means for controlling display by the third display means, and it may be constructed so that the display mode of the variable display or stop display by the third display means is also instructed to the second display control means. Of course, the second display control means and the third display control means are formed on the same circuit board.

The first display means or the third display means may be constructed so as to be able to move in directions of up and down, right and left, before and behind, reciprocally move, inducibly vibrate or rotate. In this case, the symbol display part may be constructed so as to move according to the movement of the first display means or the third display means. Based on these operations, it can expect more interesting effect and there may be a case that such operations are applicable for concerning with game contents.

It is enough for the symbol display area that the first display means or the third display means can be seen therethrough.

As concerning with the moving display of the game information, the moving display of the game information over the first display area and the second display area is not limited to that the starting point thereof exists in the first display area or the second display area.

When the internal winning combination determination means selects the predetermined or special winning combination, the game information concerning with the predetermined or special winning combination may be moved and displayed over the first display area including the symbol display areas and the second display area before a part or all of the game result is displayed or stopped and displayed in the first display means. Based on the construction according to the above, the player gazing the symbol display area can confirm the game information concerning with the winning combination without changing direction of eye sight, and since the game information is displayed with low velocity or for a long time, the player does not miss the game information and can reconfirm contents thereof at any time and can concentrate to the game in excess of the previous case. In this case, any game is applicable and letter information, symbols or characters capable of speculating the winning combination can be utilized. Further, the game information, which concerns with the winning combination won before one game unit or plural game units and not materialized yet, may be moved and displayed.

The game information may be moved or moved and displayed by the predetermined display mode over plural game units. Thereby, the player can continue the games with expectation that occurrence of the predetermined or special beneficial state will be gradually approaching.

And in the embodiment as mentioned, though it is utilized the moving and displaying of the rat fireworks and the enlarging and displaying of the window frame display areas as change in the display mode, the present invention is not limited to these. It may be utilizable as change in the display mode reduction of the window frame display area, change of width thereof, change in color thereof, change in shape thereof and change in moving velocity of the rat fireworks in the embodiment moved and displayed while effect thereby, change in color thereof, change in shape thereof or moving and displaying thereof while changing in shape.

And the window frame display area may be displayed or moved and displayed corresponding to a predetermined operation by the player and the like person (including clerk and sales person). Further, the window frame display area may be easily moved and displayed corresponding to a specific operation by the player. For example, expectation value (information concerning with the game) may be changed according to the specific operation by the player and the like person, and velocity of moving and displaying of the window frame display area, number, color, coloring, pattern, shape (outer shape or inner shape) thereof may be changed corresponding so-called stock number and the like.

And although the window frame display area corresponds to each reel, the present invention is not limited to this. The window frame display area may be displayed so as to enclose one or plural reels.

Further, when seeing the front side of the gaming machine, non-display area of symbol, by which the display means arranged at rear side of the second display means cannot be seen and recognized, may be formed in the second display means and the window frame display area may be formed around the area including the symbol display area and the non-display area of symbol. And the window frame display area may be formed inner side than outline of the symbol display area. Here, it is enough that the window frame display area indicates a case that the display means arranged at the rear side of the second display means can be seen when the player directs their eyes to inside of the window frame display area.

Further, the window frame display area may be formed around the symbol display area formed in the second display means, in order to see and recognize the third display means.

And at least a part or entire of the window frame display area may be formed in the symbol display area and light transmittability of a part or entire of the window frame display area formed within the symbol display area may be constructed so as to be variably displayed. Here, at least a part or entire of the window frame display area formed within the symbol display area may be the specific window frame display area.

The above mentioned window frame display area may be constructed so as to conduct variable display such as enlargement, reduction, change in shape and the like. And the gaming machine may be constructed so that a plurality of variable display modes can be controlled to display and one or plural variable display modes are selected among the above mentioned plural variable display modes according to the winning combination selected by the winning combination select means, the winning combination which is internally won but not materialized or random number lottery and the like, and the specific window frame display area is variably displayed based on the selected variable display mode. In that case, the player can see and recognize various specific window frame display areas themselves or the first display means through the specific window frame display area. Thus, variegated effect display can be conducted and thereby interest for games conducted in the gaming machine can be improved.

Further, while variably displaying in the specific window frame display area, light transmittability (easiness to see the first display means) thereof may be varied. And the specific window frame display area may have the same light transmittability thereover and the light transmittability in plural stages. As the concrete example, the specific window frame display area may be constructed so as to have high light transmittability (easier to see the first display means) at circumferential part of the center thereof and low light transmittability (harder to see the first display means) at a part according that such part is apart from the circumferential part of the center thereof. Also in the thus constructed case, variegated effect display can be conducted. Further, the light transmittability of the specific window frame display area may be constructed so as to vary in time series (by stages or continuously according to elapsing of time). In that case, velocity or direction in varying of the light transmittability may be changed. Thereby, more profound effect can be realized.

And the gaming machine may be constructed so that the light transmittability of the specific window frame display area is changed according to the winning combination selected by the winning combination select means, the winning combination which is internally won but not materialized or random number lottery and the like. Substantially at the same time, movement and size of the specific window frame display area may be changed. Thereby, the player see change in display of the specific window frame display area while expecting occurrence of the beneficial state, thus not only effect but also interest for games can be improved.

Further, the gaming machine may be constructed so that the window frame display area has a connection with change in size, enlargement, reduction, movement, number and change in outline shape of the symbol display area, and is changed so as to be displayed at a periphery of the symbol display area which is changed according to the above. Thereby, when the player's eyes direct to the window frame display area, it can give the player the thought that the player may be able to see and recognize the first display means through the symbol display area. Therefore, variegated effect can be conducted. Further, the above construction can be also utilized to lead the player's eyes. And such case can contribute to improvement of interest for games.

And there may be a case that the window frame display area is not displayed at the periphery of the symbol display area. As an example of that case, it may be conceivable a case utilized in so-called assist game. In this case, the gaming machine may be constructed so as to include a plurality of stop buttons and a plurality of the window frame display areas corresponding to the plural stop buttons, wherein the internal winning combination is determined based on an output from the game start instruction means, wherein the control means of the gaming machine determines beforehand operation order of the stop buttons (for example, the above mentioned stop buttons) before operations (stop operations) is conducted by the player, and wherein the control means controls the first display means so as to materialize the internal winning combination when actual operation order by the player coincides with the determined operation order. Thereby, display mode of the plural window frame display areas may be changed according to the order corresponding to the operation order of the plural stop buttons, the operation order being determined beforehand by the control means of the gaming machine. In this case, if the player operates the stop buttons corresponding to the window frame display area that the display mode is changed, the internal winning combination is certainly materialized or materialized with high probability. Thereby, it is easy for the player to understand the operation order of the stop buttons, and interest for games is also improved. Here, it is enough for the symbol display area that the player can see and recognize the first display means or the third display means through the symbol display area.

Further, the gaming machine may be constructed so that the symbol display area can conduct variable display such as enlargement, reduction or change in shape thereof and the like. Further, the gaming machine may be constructed so that a plurality of variable display modes can be controlled to display and one or plural variable display modes are selected among the above mentioned plural variable display modes according to the winning combination selected by the winning combination select means, the winning combination which is internally won but not materialized or random number lottery and the like, and the symbol display area is variably displayed based on the selected variable display mode. In that case, the player can see and recognize various symbol display areas themselves or the symbols displayed on the first display means through the symbol display areas. Thus, variegated effect display can be conducted and thereby interest for games conducted in the gaming machine can be improved.

Further, while variably displaying the symbol display area, light transmittability (easiness to see the first display means) thereof may be varied. And the symbol display area may have the same light transmittability thereover and the light transmittability in plural stages. As the concrete example, the symbol display area may be constructed so as to have high light transmittability (easier to see the first display means) at circumferential part of the center thereof and low light transmittability (harder to see the first display means) at a part according that such part is apart from the circumferential part of the center thereof. Also in the thus constructed case, variegated effect display can be conducted. Further, the light transmittability of the symbol display area may be constructed so as to vary in time series (by stages or continuously according to elapsing of time). In that case, velocity or direction in varying of the light transmittability may be changed. Thereby, more profound effect can be realized.

And the gaming machine may be constructed so that the light transmittability of the symbol display area is changed according to the winning combination selected by the winning combination select means, the winning combination which is internally won but not materialized or random number lottery and the like. Substantially at the same time, movement and size of the symbol display area may be changed. Thereby, the player see change in display of the symbol display area while expecting occurrence of the beneficial state, thus not only effect but also interest for games can be improved.

And in the embodiment, though the reels 3L, 3C, 3R are adopted as the first display means and the liquid crystal display device 31 is adopted as the second display means, the present invention is not limited to this. For example, CRT, LCD, plasma display, 7-segment LED, LED dot-matrix, lamp, LED, fluorescent lamp, organic EL display, disc, electronic paper, flexible LED, flexible liquid crystal, liquid crystal projector, FED and the like can be adopted as the first display means, the second display means or the third display means. Further, the third display means different from the first display means and the second display means can be arranged at a more front side than the second display means when seeing the front side of the gaming machine, between the first display means and the second display means, or at a more rear side than the first display means when seeing the front side of the gaming machine. The display result displayed on the first display means, the second display means or the third display means is constructed from still images or moving images. The combination, in which two or more or all of the first display means, the second display means and the third display means are combined, can be integrally constructed. In this case, there may be a case that the unit integrally constructed can be wholly exchanged, and this case is preferable since time and labor for decomposing work or assembling work thereof can be omitted and maintenance work can be improved. Further, if parts and construction can be commonly used in the unit, this case is preferable since it can contribute to cost reduction. Of course, if the illumination means commonly utilizable for the common illumination means is included in the unit, the same effect similar to the above can be expected.

Further, the beneficial state includes: a state that a predetermined combination (for example, replay, BB, RB, small combination, single bonus and the like) is materialized; free game; a state that information necessary for the player to favorably advance the game is notified; a state that probability to get internal winning of a predetermined combination is high; a state that winning of a predetermined combination is materialized with high probability; winning of a predetermined combination or a predetermined combination carried over is permitted to materialize with high probability; so-called “challenge time” that the reels are basically stopped based on the operation timing of the stop buttons by the player; small combination; medium combination; big combination; combination (state that so-called “symbol start opening” (symbol variable movement is started when a ball enters in the symbol start opening) is opened or enlarged; so-called “probability changing state”, so-called “time shortening state”); or combination of the above states. Here, the small combination, the medium combination and the big combination concern with a state that so-called “big winning opening” is opened in the so-called Japanese Pachinko gaming machine.

And when the internal winning combination determination means determines a predetermined combination (for example, bonus) as the internal winning combination, one or plural or all of the illumination means included in the common illuminations means can be turned off. For example, the LED lamps 29 arranged for each of the reels 3L, 3C, 3R can be turned off every the operation button corresponding thereto is operated or every the operation button other than the above operation button is operated. Based on the above constructions, interest for games increases. And the forward illumination means (the fluorescent lamps 38*a*, 38*b*) can be provided for each of the symbol display parts (the reel 3L, 3C, 3R).

Further, one or plural or all of the illumination means included in the common illumination means can be constructed so as to variably display. For example, still images or moving images can be displayed on the first display means (reel sheet) by changing the turning on mode of the LED lamps 29 or light colors emitted therefrom or by continuously changing those. And self-emitting type plasma display, organic EL display and the like may be adopted as the illumination means (one example of the third illumination means), thereby images can be displayed on the first display means. By this constructions, interest for games increases.

In a case that the special game result (for example, the symbol combination indicating that bonus winning is materialized) is displayed on the first display means or the second display means, it can be provided the special gaming state producing means that the beneficial state for the player is displayed thereon. And both the special gaming state producing means and the second display means can be formed on single control circuit board. And the gaming state can be displayed by superimposing the images displayed on the first display means and the images displayed on the second display means. Further, based on the trigger that a predetermined state is realized, the effect display on the second display means can be done so as to avoid the specific symbols stopped and displayed on the symbol display part or so as to superimpose the specific symbols. If the gaming state is displayed by the superimposed images, the beneficial state for the player may be produced with high probability in comparison with the case in which the superimposed images is not displayed. Thereby, it can include the effect that the player's expectation increases, in excess of the previous case. Thus, such effect can contribute to increase of interest.

In the embodiment, though the start lever 10 is adopted as the game start instruction means, the present invention is not limited to this. For example, the BET switch 5, the medal insertion slot 6, the medal sensor 6S or the start switch 10S can be adopted.

The display includes: display by the sense of sight, display by the sense of hearing, notification by the sense of smelling, turning on of the lamps or combination of those. The display mode includes: colors, patterns, shapes (outline shapes, interior shapes) and the like. And the game result can be displayed after operation of the game start instruction means or the game result leading means.

In the embodiment, though the above mentioned LED drive circuit is utilized as the display control means for a plurality of the ornamental lamps, the LED lamps and the fluorescent lamps, each of which is arranged in the cabinet, the present invention is not limited to this. Turning on control of the LED lamps may be conducted by another display control means. In this case, for example, in turning on control of the LED lamps, electric power may be provided so that the LED lamps are always turned on during a period from power-on of the gaming machine till power-off thereof. Here, turning on includes blinking mode that the LED lamps are intermittently blinked with a very short time interval. Thus, since the LED lamps are always turned on, light emitted from the LED lamps always illuminates each symbol display area even if abnormality occurs in the mentioned LED drive circuit. Thereby, the player can always see the symbols arranged on each of the reels through the each symbol display areas, thus the above turning on control is preferable.

Further, turning on control of the above mentioned fluorescent lamps may be done by another display control means. In this case, for example, in the turning on control of the fluorescent lamps, electric power may be provided so that the fluorescent lamps are always turned on during a period from power-on of the gaming machine till power-off thereof. Thereby, similar to the above, light emitted from the fluorescent lamps always illuminates each symbol display area even if abnormality occurs in the mentioned LED drive circuit. Thereby, the player can always see and recognize the symbols arranged on each of the reels through the each symbol display areas.

Further, in the embodiment, though the above mentioned sub-CPU conducts display control of a plurality of the ornamental lamps arranged in the cabinet, sound output control and image display control of the liquid crystal display device, the present invention is not limited to this. Another sub-CPU separate from the above sub-CPU may conduct the above various controls. For example, in a case that another sub-CPU separate from the above sub-CPU conducts the control of a plurality of the ornamental lamps arranged in the cabinet and, for example, in a case that abnormality occurs in the display control, it is enough to exchange only the sub-CPU with abnormality occurrence or only the circuit construction including the sub-CPU with abnormality occurrence to the normal sub-CPU or circuit construction having the normal sub-CPU. Therefore, time and labor for removing the cause of the abnormality occurrence can be omitted and such construction is very preferable. And in a case that another sub-CPU other than the above sub-CPU conducts sound output control or image display control, or for example, in a case that abnormality occurs in the sound output control or the image display control, it is enough to exchange only the sub-CPU with abnormality occurrence or only circuit construction including the sub-CPU with abnormality occurrence.

Further, the liquid crystal display device described in the embodiment may have image enlarging means for enlarging the input images by a predetermined magnification. For example, the image enlarging means may convert the image data for 640×480 dots into the image data for 1024×768 dots and output the converted image data to the display part (above mentioned terminal part). Thereby, it can use the image data for small display area, the data quantity thereof being less in comparison with that for the factual display area. As a result, memory quantity of the ROM and image data forming time can be reduced.

And in the embodiment, though the symbol display area is divided corresponding to each of three reels 3L, 3C, 3R, the present invention is not limited to this and the symbol display area may be formed so as not to be divided. For example, it may be conceivable that two or three of the reels 3L, 3C, 3R can be seen and recognized through one symbol display area. And if the first display means and the third display means are arranged at the rear face or side of the second display means, it may be constructed that the player sees through one symbol display area a part or whole of the first display means and a part or whole of the third display means. When the reflection means is produced, there may be a case that the reflection means can be easily produced in comparison with a case that a plurality of transparent portions are formed dividedly.

Further, the present invention can apply to Japanese Pachinko gaming machine, arrange ball gaming machine, mah-jong ball gaming machine, video-slot machine, video poker machine and the other machines, in addition to the slot machine in the embodiment. And even in the game program imitatively executing operation of the above mentioned slot machine in a family gaming machine, the present invention can apply and execute the game. In this case, CD-ROM, FD (flexible disc) and the similar memory medium can be utilized for the memory medium for storing the game program.

Here, recently in the Japanese Pachinko gaming machine in the main current, the gaming machine, in which an electric display device such as the liquid crystal display device is arranged at the center of gaming plate, is popularized. In this electric display device, a plurality of symbols (abbreviated as "special symbols" hereinafter) represented by images are variably displayed, thereby three lines of reels in the slot machine are imitatively displayed. When variable display of the special symbols stops and a predetermined stop mode (in which the same special symbols stop such as 7-7-7 and this stop mode is generally called "big combination"), the game shifts to the special gaming state beneficial for the player. In general Japanese Pachinko gaming machine, the variable display of the special symbols is started on condition that balls shot within the gaming plate by operation of the shooting handle enter into a predetermined winning hole (so-called "variable display start hole"). After a predetermined time is elapsed the variable display of the special symbols stops.

In this kind of Japanese Pachinko gaming machine, it may be arranged the liquid crystal display device (the second display means) and the first display means (for example, drum-type reels) at the rear side than the display area (display plane) of the liquid crystal display device when seeing the front side of the gaming machine. And the special symbols may be variably displayed on one or both of the first display means (for example, the liquid crystal display device) and the second display means (for example, drum-type reels).

The above mentioned game result display means may be constructed so as to include the first display means and the second display means provided at a more front side than the display area of the first display means when seeing the front surface of the gaming machine. And the game result display means may be constructed so as to include the first display means and the second display means provided at a more front side than the display area of the first display means when seeing the front side of the gaming machine.

The above mentioned rear illumination means illuminates the second display means from the backside thereof. And the above mentioned front illumination means illuminates the second display means from the backside of thereof. And the front illumination means may illuminate the second display means from the side plane thereof.

The above mentioned first display means and/or the second display means may be formed in a curved shape. As for extent of the curvature, the first display means and the second display means may have substantially the same curvature. Thereby, there may be a case that design of the gaming machine is improved and the gaming machine is made attractive. Even if the first display means is curved with a small radius of curvature or with a large radius of curvature, the above same effect can be obtained.

The above mentioned reflection means corresponds to means which has at least function to refract a part or whole of light led by the light leading means toward the liquid crystal panel and illuminate the liquid crystal panel.

The above mentioned game start instruction means may be a variable symbol display start hole which produces an output signal when the winning combination or passage of the ball is detected. The game start instruction means in the ball flipping machine corresponds to the variable display start hole for the special symbols (or the start gate), the variable display start hole for the common symbols, the various judging symbol display start holes (or the start gates).

In a case that the above mentioned internal winning combination determination means determines the predetermined combination as the internal winning combination, one or plural illumination means included in the common illumination means is/are turned off. Or the illumination means may always be turned off.

There may be a case that one or plural illumination means included in the common illumination means is/are turned off at the substantially same timing that the above mentioned internal winning combination determination means determines the predetermined combination as the internal winning combination. Or the illumination means may always be turned off.

As for variable display by the illumination means included in the common illumination means, it is conceivable various display modes. For example, it may be constructed so as to be able to execute the special symbol variable display. Here, the special symbol variable display can be executed in the mode such as: brightness in a part or whole of the display part in the illumination means differs from that in the non-specific symbol variable display; still images, moving images, specific letters, numbers, figures, characters, which are not displayed in the non-specific symbol variable display, are displayed; variable display speed differs from that in the non-specific symbol variable display. Further, voluntary display modes may be utilized. And in a case that the specific symbol variable display is conducted, it may be constructed that the beneficial state for the player occurs with high probability in comparison with the case that the specific symbol variable display is not done. Thereby, it can be included the effect that the player's expectation increases, in excess of the previous case. Thus, such effect can contribute to increase of interest.

As for the means adopted as the third display means, it may be adopted display devices which is applicable as the first display means and the second display means, as mentioned above. It may be a case that one or plural effect display reels is/are utilized as the third display means, and both the first display means and the third means are arranged at the rear surface or side of the second display means. In this case, the symbol display area through which the player sees the display area of the third display means may be provided in the second display means. Thereby, the player can easily recognize the display contents on the display area of the third display means, thus this construction is very preferable.

Further, it may be controlled so that the images formed by superimposing the images of the second display means and the images of the third display means are seen by the player, and when such control occurs, the beneficial state occurs with higher probability than the case that such control does not occur. Thereby, it can be included the effect that the player's expectation increases, in excess of the previous case. Thus, such effect can contribute to increase of interest.

Further, any one of the first display means, the second display means and the third display means may be constructed form a movable structure with shapes such as figures, dolls, animals, insects, famous structures, fishes, vehicles. For example, the above structures may be moved with rotation, swing, reciprocal movement or vibration in cases that: the special combination is internally won, the special combination is materialized, the number of the combination which is as same as the special combination internally won but not materialized exceeds a predetermined number, the special images are displayed on the display means different from the above structures. And there may be a case that the above structure is constructed from plural members and a part of the members is/are moved. In this case, there may be a case that it can be further expected more various effects by displaying on other than the image display device.

Further, the front illumination means may be arranged at the front side of the first display means and the second display means. In this case, if the inside of the game arcade is dark, the front illumination means can illuminate both the first display means and the second display means with enough light. Therefore, there may be a case that the player can clearly recognize the images displayed on the display means, thus it can be expected that the player can enjoy more various effects in the gaming machine.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

This application is related to co-pending U.S. patent applications entitles "GAMING MACHINE" referred to as Ser.

No. 10/697,942, "GAMING MACHINE" referred to as Ser. No. 10/697,946, "GAMING MACHINE" referred to as Ser. No. 10/697,244, "GAMING MACHINE" referred to as Ser. No. 10/697,441, "GAMING MACHINE" referred to as Ser. No. 10/697,249, "GAMING MACHINE" referred to as Ser. No. 10/697,004, "GAMING MACHINE" referred to as Ser. No. 10/697,251, "GAMING MACHINE" referred to as Ser. No. 10/697,254, "GAMING MACHINE" referred to as Ser. No. 10/697,005, "GAMING MACHINE" referred to as Ser. No. 10/697,006, "GAMING MACHINE" referred to as Ser. No. 10/697,004, "GAMING MACHINE" referred to as Ser. No. 10/697,007, "GAMING MACHINE" referred to as Ser. No. 10/697,042, "GAMING MACHINE" referred to as Ser. No. 10/697,158, "GAMING MACHINE" referred to as Ser. No. 10/697,039, "GAMING MACHINE" referred to as Ser. No. 10/697,157, "GAMING MACHINE" referred to as Ser. No. 10/697,040, "GAMING MACHINE" referred to as Ser. No. 10/697,041, "GAMING MACHINE" referred to as Ser. No. 10/697,026, "GAMING MACHINE" referred to as Ser. No. 10/697,054, "GAMING MACHINE" referred to as Ser. No. 10/697,082, "GAMING MACHINE" referred to as Ser. No. 10/697,088, "GAMING MACHINE" referred to as Ser. No. 10/697,080, "GAMING MACHINE" referred to as Ser. No. 10/697,081, "GAMING MACHINE" referred to as Ser. No. 10/697,027, "GAMING MACHINE" referred to as Ser. No. 10/697,086, "GAMING MACHINE" referred to as Ser. No. 10/697,237, "GAMING MACHINE" referred to as Ser. No. 10/697.238, "GAMING MACHINE" referred to as Ser. No. 10/697,947, "GAMING MACHINE" referred to as Ser. No. 10/697,245, "GAMING MACHINE" referred to as Ser. No. 10/697,246, "GAMING MACHINE" referred to as Ser. No. 10/697,248, "GAMING MACHINE" referred to as Ser. No. 10/697,084, "GAMING MACHINE" referred to as Ser. No. 10/697,432, "MOTOR STOP CONTROL DEVICE" referred to as Ser. No. 10/697,085, "GAMING MACHINE" referred to as Ser. No. 10/697,256, "GAMING MACHINE" referred to as Ser. No. 10/697,281, "GAMING MACHINE" referred to as Ser. No. 10/697,261, "GAMING MACHINE" referred to as Ser. No. 10/697,258, respectively, all the applications being filed on Oct. 31, 2003, herewith. The co-pending applications including specifications, drawings and claims are expressly incorporated herein by reference in their entirety.

What is claimed is:

1. A gaming machine comprising:

game start instruction means for instructing a start of a game;

internal winning combination determination means for determining an internal winning combination based on a game start instruction command from the game start instruction means;

game result display means for displaying a result concerning with the game, the game result display means including first display means having a plurality of reels on each of which plural symbols are formed and second display means arranged in front of a display area of the first display means when seen from a front side of the gaming machine and the second display means having a symbol display area capable of transmittably displaying a display result of the first display means therethrough;

beneficial state generating means for generating a beneficial state for a player when a specific game result is displayed on the first display means of the game result display means; and display control means for controlling the second display means;

wherein the second display means is constructed from a liquid crystal display device including a liquid crystal panel, a light guide device arranged at a rear side of the liquid crystal panel, an illumination device for generating light which is guided to the light guide device and a reflection device for reflecting light guided to the light guide device toward the liquid crystal panel arranged in front of the light guide device, wherein the reflection device is constructed from a reflection film having a reflection area for reflecting light from the light guide device toward the liquid crystal panel and plural non-reflection areas, each of which corresponds to each reel, the non-reflection areas being made light transmittable, and wherein the display control means controls the second display means so as to display game information corresponding to the internal winning combination within a first area including the symbol display area while changing a light transmittance rate of the symbol display area so as to become low and move the game information from the first area to a second area not including the symbol display area while changing the light transmittance rate of the symbol display area so as to become high.

2. The gaming machine according to claim 1, wherein the first display means has one or more symbol display parts capable of variable display, and wherein the display control means controls the second display means so as to move and display the game information from the first area to the second area substantially at the same time as the variable display in the symbol display parts is stopped and displayed.

3. The gaming machine according to claim 1, wherein the light transmittance rate of the symbol display area in the second display means is changed so as to screen the display result of the first display means.

4. The gaming machine according to claim 1, wherein a window frame display area is formed at a periphery of the symbol display area, and wherein display mode of the window frame display area is changed when the game information is displayed in the first area.

5. The gaming machine according to claim 1, wherein the display control means conducts displaying concerning with a specific winning combination as the game information when the internal winning combination determination means determines the specific winning combination as the internal winning combination.

6. The gaming machine according to claim 1, wherein the game information is displayed in an enlarged state when moved to the second area.

7. The gaming machine according to claim 1, wherein the game information is vertically displayed within the first area and is horizontally displayed in the second area.

8. A gaming machine comprising:

a game start instruction device for instructing a start of a game;

an internal winning combination determination device for determining an internal winning combination based on a game start instruction command from the game start instruction device;

a game result display device for displaying a result concerning with the game, the game result display device including a first display device having a plurality of reels on each of which plural symbols are formed and a second display device arranged in front of a display area of the first display device when seen from a front side of the gaming machine and the second display device having a symbol display area capable of transmittably displaying a display result of the first display device therethrough;

a beneficial state generating device for generating a beneficial state for a player when a specific game result is displayed on the first display device of the game result display device; and a display control device for controlling the second display device;

wherein the second display means is constructed from a liquid crystal display device including a liquid crystal panel, a light guide device arranged at a rear side of the liquid crystal panel, an illumination device for generating light which is guided to the light guide device and a reflection device for reflecting light guided to the light guide device toward the liquid crystal panel arranged in front of the light guide device, wherein the reflection device is constructed from a reflection film having a reflection area for reflecting light from the light guide device toward the liquid crystal panel and plural non-reflection areas, each of which corresponds to each reel, the non-reflection areas being made light transmittable, and wherein the display control device controls the second display device so as to display game information corresponding to the internal winning combination within a first area including the symbol display area while changing light transmittance rate of the symbol display area so as to become low and move the game information from the first area to a second area not including the symbol display area while changing the light transmittance rate of the symbol display area so as to become high.

9. The gaming machine according to claim 8, wherein the first display device has one or more symbol display parts capable of variable display, and wherein the display control device controls the second display device so as to move and display the game information from the first area to the second area substantially at the same time as the variable display in the symbol display parts is stopped and displayed.

10. The gaming machine according to claim 8, wherein the light transmittance rate of the symbol display area in the second display device is changed so as to screen the display result of the first display device.

11. The gaming machine according to claim 8, wherein a window frame display area is formed at a periphery of the symbol display area, and wherein display mode of the window frame display area is changed when the game information is displayed in the first area.

12. The gaming machine according to claim 8, wherein the display control device conducts displaying concerning with a specific winning combination as the game information when the internal winning combination determination device determines the specific winning combination as the internal winning combination.

13. The gaming machine according to claim 8, wherein the game information is displayed in an enlarged state when moved to the second area.

14. The gaming machine according to claim 8, wherein the game information is vertically displayed within the first area and is horizontally displayed in the second area.

15. A gaming method comprising steps of:

instructing a start of a game;

determining an internal winning combination based on a game start instruction command;

displaying a result concerning with the game on a first display device having a plurality of rotatable reels with a variety of symbols disposed a circumferentially about each reel;

generating a beneficial state for a player when a specific game result is displayed on the first display device; and controlling a second display device in a form of a liquid crystal display having an effect display area and a plurality of symbol display areas, the effect display area surrounding each one of the symbol display areas, the second display device arranged in front of the first display device so that, after starting the game start causing rotation of the plurality of reels and when an internal winning combination is determined, forward-most ones of the symbols of one stopped reel are displayed through a corresponding symbol display area and game information is superimposed, at least partially, over the displayed forward-most ones of the symbols of the one stopped reel within the corresponding symbol display area and, thereafter, the game information moves from the corresponding symbol display area to the effect display area for display thereon.

16. The gaming method according to claim 15, wherein in the controlling step, the second display device is controlled so as to move and display the game information from the corresponding symbol display area to the effect display area substantially at the same time as the first display device is stopped.

17. The gaming method according to claim 15, wherein in the controlling step, a display mode of a window frame display area formed at a periphery of the symbol display area is changed when the game information is displayed in the symbol display area.

18. The gaming method according to claim 15, wherein in the controlling step, displaying concerning with a specific winning combination as the game information is conducted when the specific winning combination is determined as the internal winning combination in the determining step.

19. The gaming method according to claim 15, wherein the game information is displayed in an enlarged state when moved to the effect display area.

20. The gaming machine according to claim 15, wherein the game information is vertically displayed within the first area and is horizontally displayed in the second area.

21. A gaming machine comprising:

a game result display device for displaying a result concerning with the game, the game result display device including a first display device having a plurality of reels on each of which plural symbols are formed and a second display device arranged in front of a display area of the first display device when seen from a front side of the gaming machine and the second display device having a symbol display area capable of transmittably displaying a display result of the first display device therethrough; and a processor in communication with the first display device and the second display device so as to (a) instruct a start of a game, (b) determine an internal winning combination based on a game start instruction command, (c) generate a beneficial state for a player when a specific game result is displayed on the first display device of the game result display device and (d) control the second display device so as to display game information corresponding to the internal winning combination within a first area including the symbol display area while changing light transmittance rate of the symbol display area so as to become low and move the game information from the first area to a second area not including the symbol display area while changing the light transmittance rate of the symbol display area so as to become high, wherein the second display means is constructed from a liquid crystal display device including a liquid crystal panel, a light guide device arranged at a rear side of the liquid crystal panel, an illumination device for generating light which is guided to the light guide device and a reflection device for reflecting light guided to the light guide device toward the liquid crystal panel arranged in front of the light guide device, and wherein the reflection device is constructed from a reflection film having a reflection area for reflecting light from the light guide device toward the liquid crystal panel and plural non-reflection areas, each of which corresponds to each reel, the non-reflection areas being made light transmittable.

22. The gaming machine according to claim 21, wherein the first display device has one or more symbol display parts capable of variable display, and wherein the processor controls the second display device so as to move and display the game information from the first area to the second area substantially at the same time as the variable display in the symbol display parts is stopped and displayed.

23. The gaming machine according to claim 21, wherein the processor changes the light transmittance rate of the symbol display area in the second display device so as to screen the display result of the first display device.

24. The gaming machine according to claim 21, wherein a window frame display area is formed at a periphery of the symbol display area, and wherein the processor changes display mode of the window frame display area when displaying the game information in the first area.

25. The gaming machine according to claim 21, wherein the processor conducts displaying concerning with a specific winning combination as the game information when determining the specific winning combination as the internal winning combination.

26. The gaming machine according to claim 21, wherein the processor displays the game information in an enlarged state when moving the game information to the second area.

27. The gaming machine according to claim 21, wherein the game information is vertically displayed within the first area and is horizontally displayed in the second area.

* * * * *